(12) United States Patent
Le Pennec et al.

(10) Patent No.: US 6,836,569 B2
(45) Date of Patent: Dec. 28, 2004

(54) METHOD AND APPARATUS FOR PROCESSING OR COMPRESSING N-DIMENSIONAL SIGNALS BY FOVEAL FILTERING ALONG TRAJECTORIES

(76) Inventors: Erwan Le Pennec, 41, Avenue du Maine, Paris (FR), 75014; Stéphane Mallat, 11, rue Bonaparte, Paris (FR), 75006

( * ) Notice: Subject to any disclaimer, the term of this patent is extended or adjusted under 35 U.S.C. 154(b) by 750 days.

(21) Appl. No.: 09/834,587

(22) Filed: Apr. 13, 2001

(65) Prior Publication Data

US 2003/0031369 A1 Feb. 13, 2003

(51) Int. Cl.[7] .............................. G06K 9/40; G06K 9/00; G06K 9/46; H04N 5/225; H04N 7/12

(52) U.S. Cl. ....................... 382/260; 382/103; 382/240; 348/169; 375/240.19

(58) Field of Search ................................. 382/103, 233, 382/240, 250, 251, 260, 266, 276, 300, 308; 345/418, 606; 348/27, 169; 375/240.19, 240.2

(56) References Cited

U.S. PATENT DOCUMENTS

| | | | |
|---|---|---|---|
| 5,416,855 A | | 5/1995 | Geiger |
| 5,615,287 A | | 3/1997 | Fu et al. |
| 5,680,862 A | * | 10/1997 | Song et al. ................. 600/410 |
| 5,790,269 A | | 8/1998 | Masaki et al. |
| 5,898,798 A | | 4/1999 | Bouchard et al. |
| 5,915,046 A | | 6/1999 | Echigo et al. |
| 6,101,284 A | * | 8/2000 | Matsubara et al. ......... 382/260 |
| 6,182,114 B1 | * | 1/2001 | Yap et al. .................... 709/203 |
| 6,252,989 B1 | * | 6/2001 | Geisler et al. ............... 382/232 |
| 6,449,382 B1 | * | 9/2002 | Ciccolo et al. ............. 382/103 |
| 6,577,312 B2 | * | 6/2003 | Deering et al. ............. 345/428 |

OTHER PUBLICATIONS

S. Carlsson, "Sketch Based Coding of Grey Level Images," IEEE Transaction on Signal Processing, vol. 15, pp. 57–83, Jul. 1988.

E. Le Pennec and S. Mallat, "Image Compression With Geometrical Wavelets."

A. Mertins, "Image Compression Via Edge–based Wavelet Transform," Opt. Eng., vol. 38, No. 6, pp. 991–1000, Jun. 1999.

9. S. Mallat and Falzon, "Analysis of Low Bit Rate Image Transform Coding," IEEE Trans. Signal Processing, vol. 46, No. 4., pp. 1–16, Apr. 1998.

(List continued on next page.)

Primary Examiner—Kanji Patel
(74) Attorney, Agent, or Firm—Baker Botts LLP

(57) ABSTRACT

Methods and apparatus for processing n-dimensional digitized signals with a foveal processing which constructs a sparse representation by taking advantage of the geometrical regularity of the signal structures. This invention can compress, restore, match and classify signals. Foveal coefficients are computed with one-dimensional inner products along trajectories of an n-directional trajectory list. The invention includes a trajectory finder which computes an n-directional trajectory list from the input n-dimensional signal, in order to choose optimal locations to compute the foveal coefficients. From foveal coefficients, a foveal reconstruction processor recovers a signal approximation which has the same geometrical structures as the input signal along the trajectories and which is regular away from these trajectories. A foveal residue can be calculated as a difference with the input signal. A bandelet processor decorrelates the foveal coefficients by applying invertible linear operators along each trajectory. Bandelet coefficients are inner products between the signal and n-dimensional bandelet vectors elongated along the trajectories. A geometric processor computes geometric coefficients by decorrelating the coordinates of these trajectories with linear operators, to take advantage of their geometrical regularity. Setting to zero small bandelet coefficients and small geometric coefficients yields a sparse signal representation.

93 Claims, 12 Drawing Sheets

OTHER PUBLICATIONS

10. X. Xue, "Image Compression Based On Low–Pass Wavelet Transform and Multi–Scale Edge Compensation," Computer Science Department of Harbin Institute of Technology, pp. 1–27.

11. S. Mallat and S. Zhong, "Characterization of Signals From Multiscale Edges," IEEE Transactions on Pattern Analysis and Machine Intelligence, vol. 14, No. 7, pp. 710–732, 1992.

12. D. Donoho and I. Johnston, "Ideal spatial adaptation via wavelet shrinkage," Biometrika, vol. 81, pp. 425–455, Dec. 1994.

13. E. Candes and D. Donoho, "Curvelets : A Surprisingly Effective Nonadaptive Representation For Objects with Edges," tech. rep., Stanford Univ., 1999, pp. 1–10.

14. JPEG 2000 Image Coding System, ISO/IEC CD 15444–I:1999 (V1.0, Dec. 9, 1999), pp. 1–164.

15. E. Chang, S. Mallat, and C. Yap, "Wavelet Foveation," pp. 1–36, Sep. 1999.

* cited by examiner

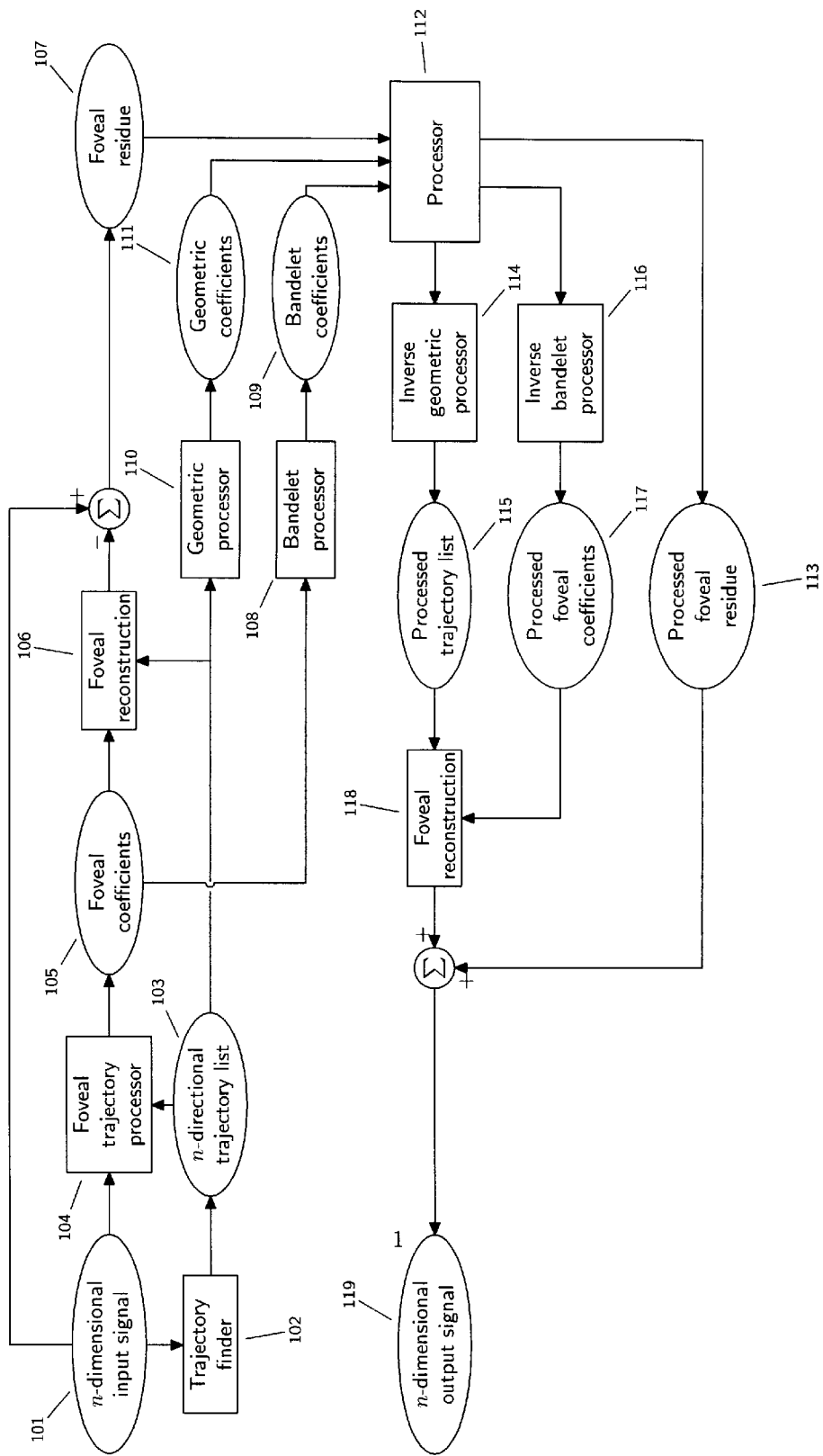
Figure 1: Exemplary embodiment of the invention.

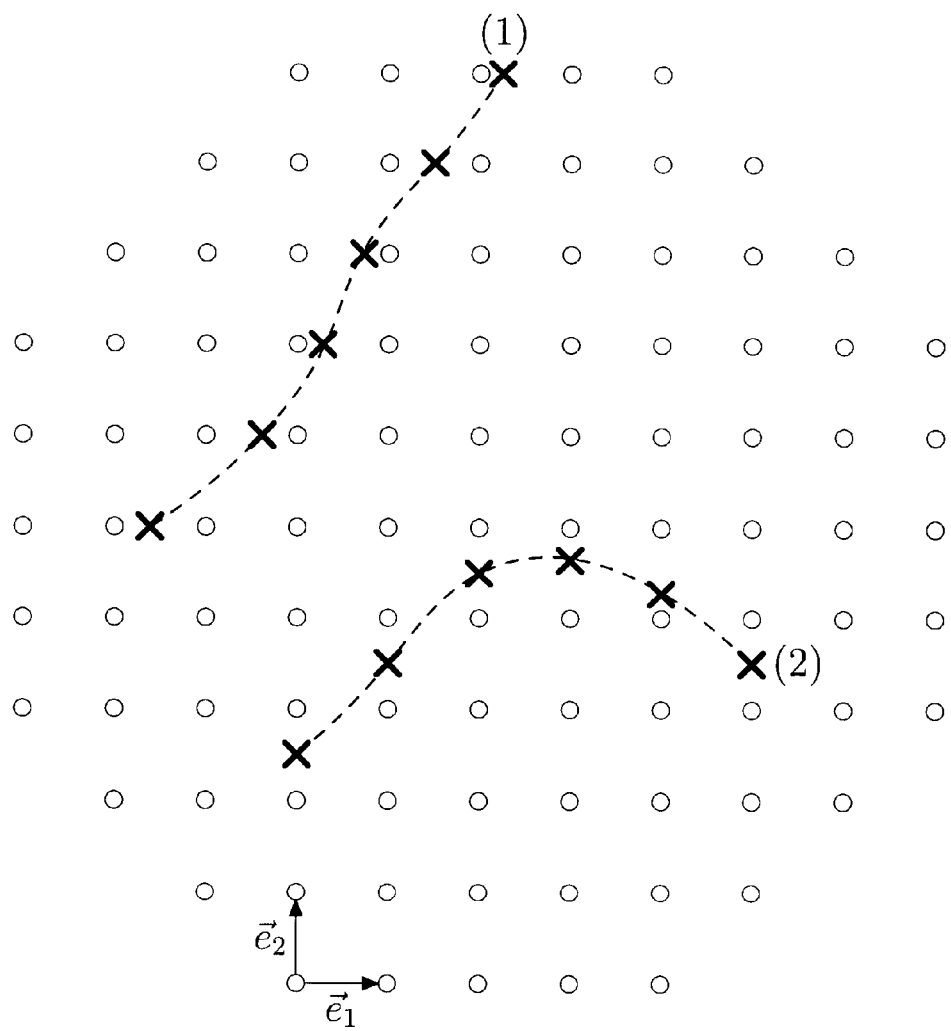
Figure 2: Illustration of the signal samples in $n = 2$ dimensions with a trajectory (1) in the direction $e_1$ and a trajectory (2) in the direction $e_2$.

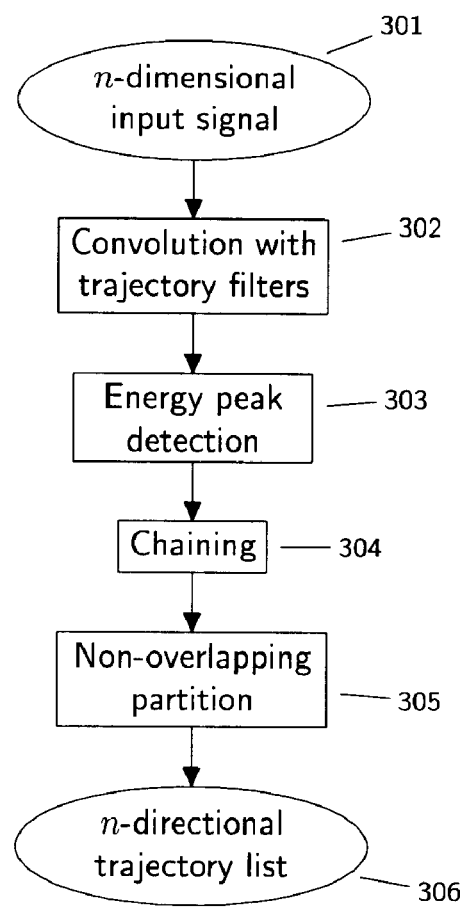
Figure 3: Exemplary configuration of the trajectory finder.

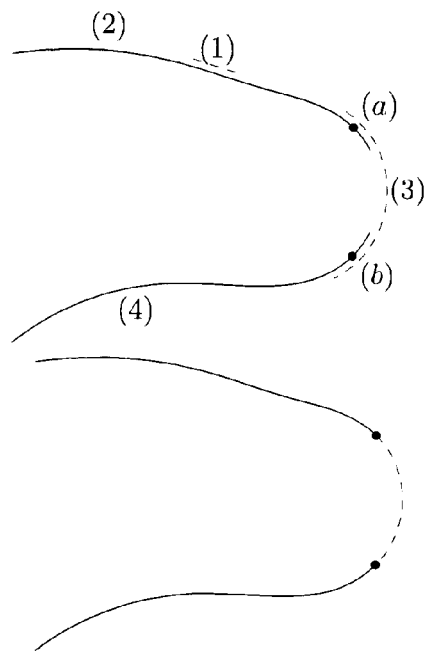
Figure 4: Trajectory integration. The overlapping trajectories of direction $e_2$ (full lines) and of direction $e_1$ (dashed lines) at the top are processed to produce non-overlapping trajectories at the bottom, which cover the same domain.

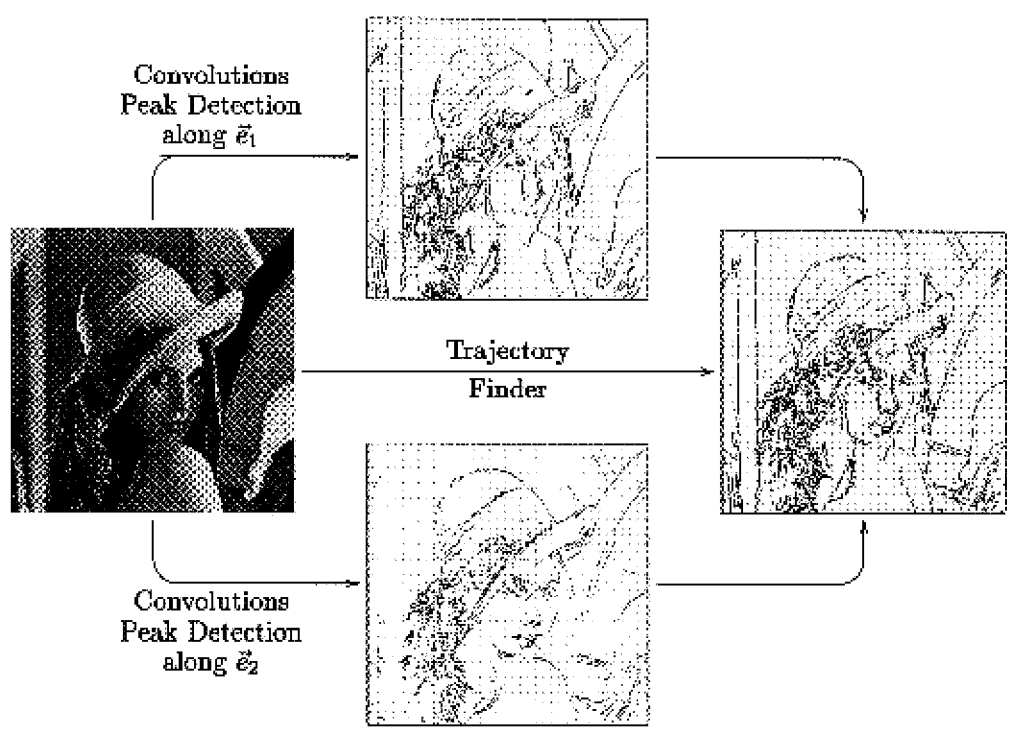
Figure 5: Illustration of a 2-directional trajectory finding in an image.

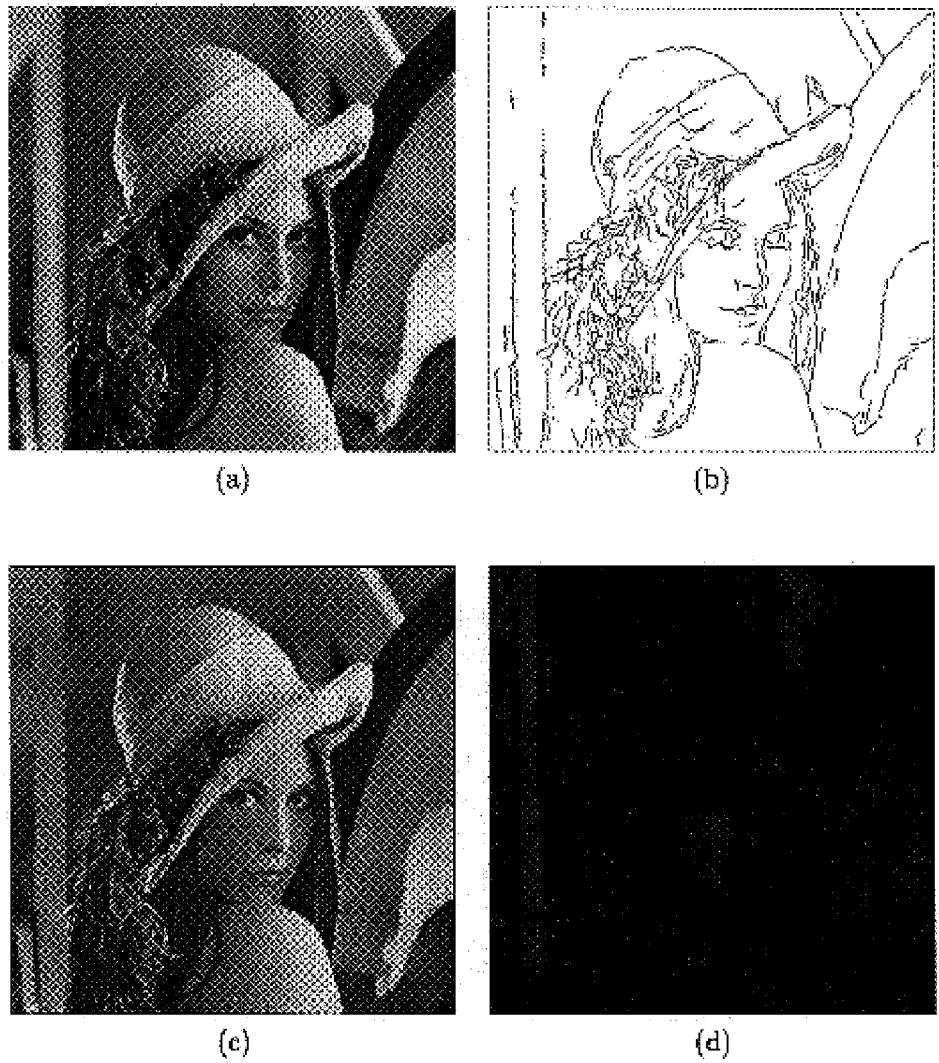
Figure 6: (a): input 2-dimensional signal. (b): 2-directional trajectory list. (c) example of reconstruction from foveal coefficients. (d): foveal residue.

Figure 7: Example of 2-dimensional signal reconstructed from thresholded bandelet and geometric coefficients.
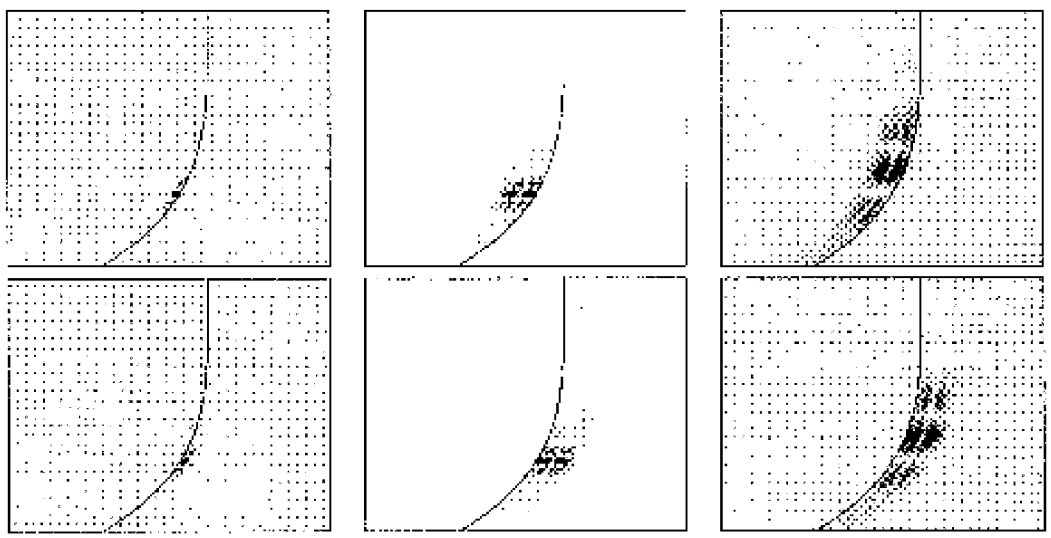
Figure 8: Examples of bandelets in $n = 2$ dimensions

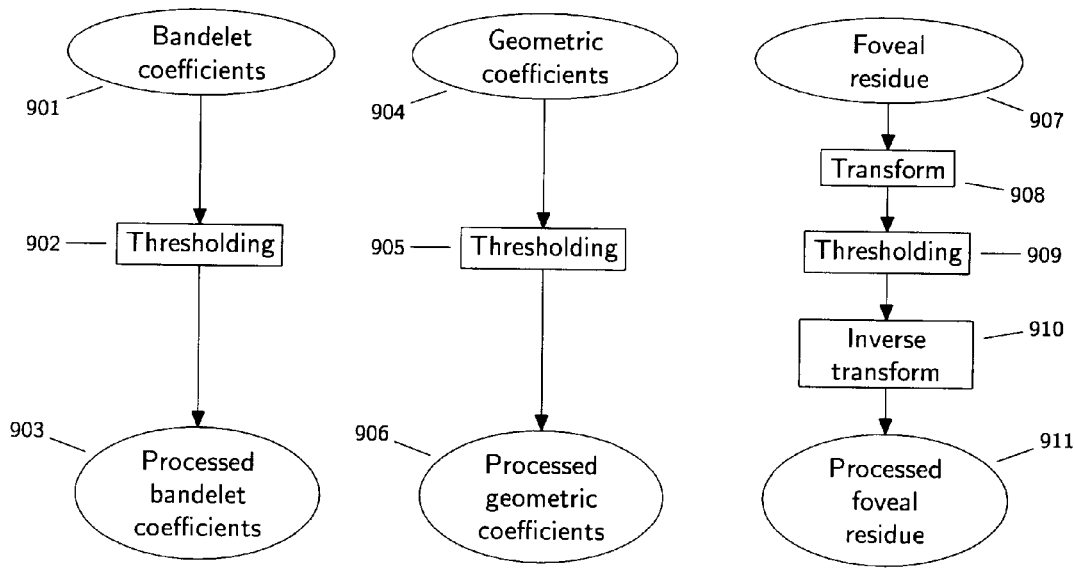
Figure 9: Outline of an exemplary processor unit

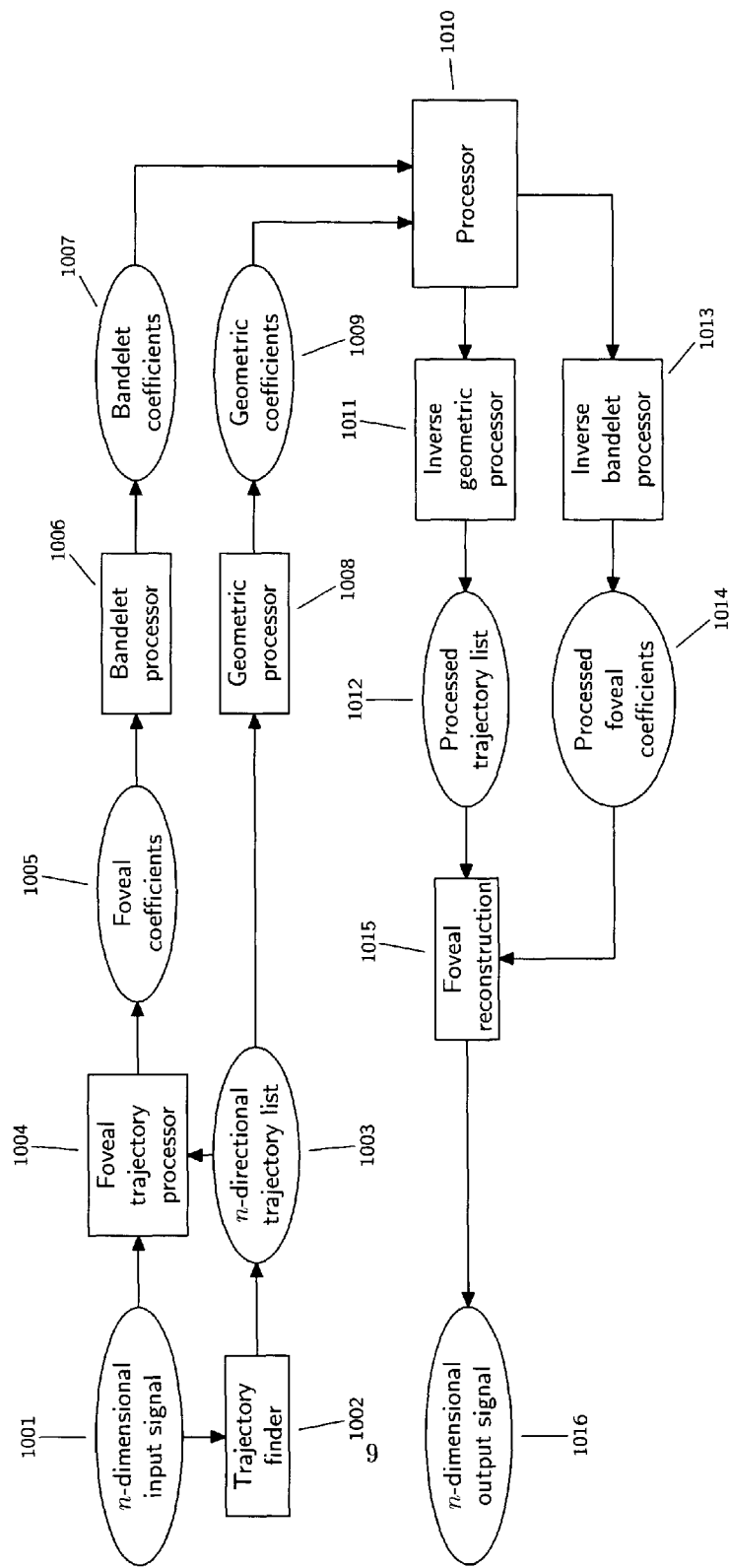
Figure 10: Outline of another processor unit

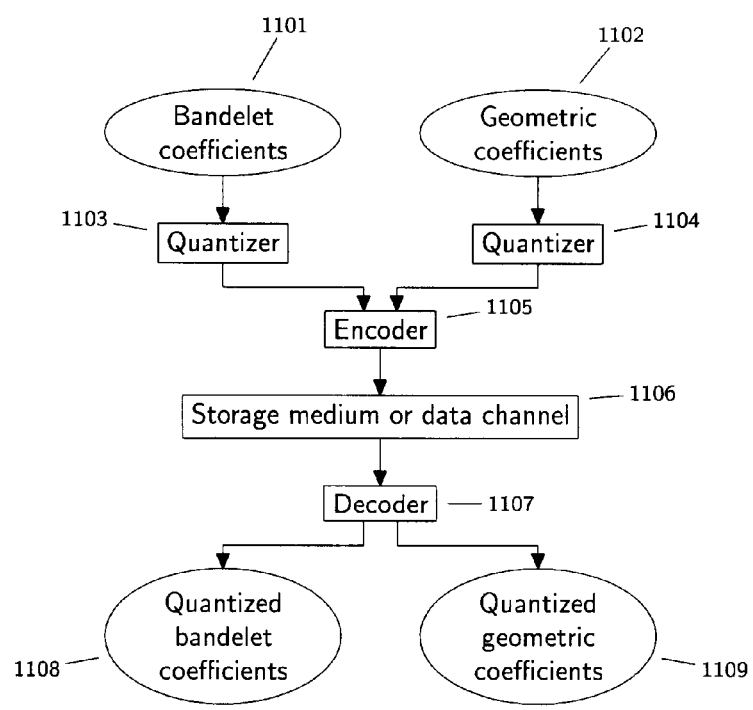
Figure 11: Outline of an exemplary processor unit adapted to signal compression

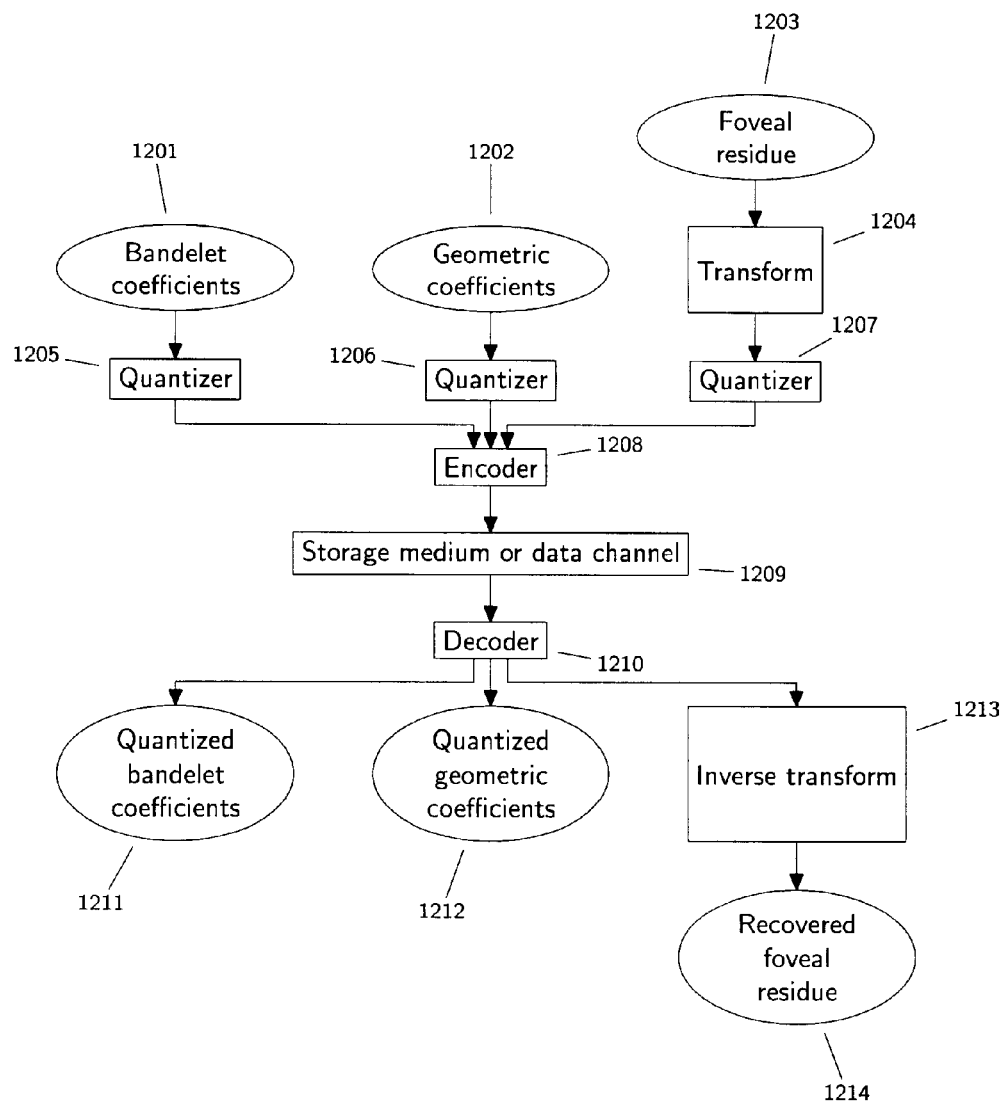
Figure 12: Outline of an exemplary processor unit adapted to signal compression

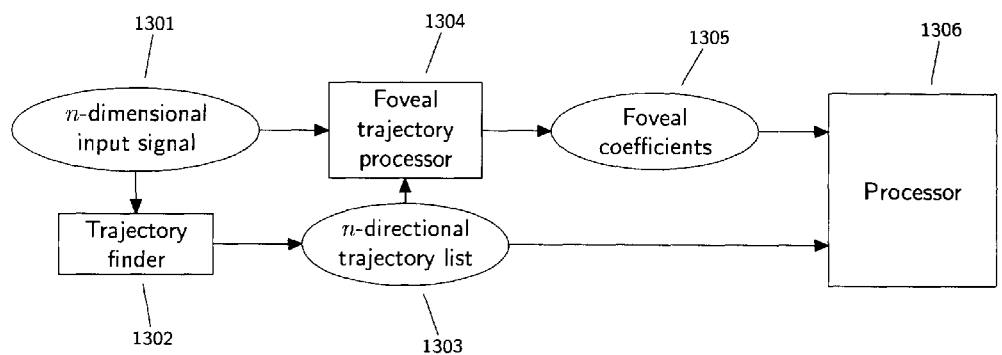
Figure 13: Outline of an exemplary subsytem for classification and matching

METHOD AND APPARATUS FOR PROCESSING OR COMPRESSING N-DIMENSIONAL SIGNALS BY FOVEAL FILTERING ALONG TRAJECTORIES

BACKGROUND OF INVENTION

The invention relates generally to a multi-dimensional signal processing method and apparatus, and in particular to a method and apparatus useful for processing multi-dimensional signals, such as two-dimensional images.

The invention is particularly pertinent to the field of image data processing and compression. Image data compression is a process which encodes images for storage or transmission over a communication channel, with fewer bits than what is used by the uncoded image. The goal is to reduce the amount of degradation introduced by such an encoding, for a given data rate. The invention is also relevant for applications to the restoration of signals by removing noises or to matching and classification applications.

In signal processing, efficient procedures often require to compute a stable signal representation which provides precise signal approximations with few non-zero coefficients. Signal compression applications are then implemented with quantization and entropy coding procedures. At high compression rates, it has been shown in S. Mallat and F. Falzon, "Analysis of low bit rate image transform coding," IEEE Trans. Signal Processing, vol. 46, pp. 1027–1042, 1998, the contents of which are incorporated in reference herein, that the efficiency of a compression algorithm essentially depends upon the ability to construct a precise signal approximation from few non-zero coefficients in the representation. Noise removal algorithms are also efficiently implemented with linear or non-linear diagonal operators over such representations, including thresholding strategies. Other applications such as classification or signal matching can also take advantage of sparse signal representations to reduce the amount of computations in the classification or matching algorithms.

For signal processing, the stability requirement of the signal representation has motivated the use of bases and in particular orthogonal bases. The signal is then represented by its inner products with the different vectors of the orthogonal basis. A sparse representation is obtained by setting to zero the coefficients of smallest amplitude. The Fourier transform which represents signals by their decomposition coefficients in a Fourier basis have mostly dominated signal processing until the 1980's. This basis is indeed particularly efficient to represent smooth signals or stationary signals. During the last twenty years, different signal representations have been constructed, with fast procedures which decompose the signal in a separable basis. Block transforms and in particular block cosine bases have found important applications in image processing. The JPEG still image coding standard is an application which quantizes and Huffman encodes the block cosine coefficients of an image. More recently, separable wavelet bases have been shown to provide a more sparse image representation, which therefore improves the applications. Wavelets compute local image variations at different scales. In particular the JPEG standard is now being replaced by the JPEG-2000 standard which quantizes and encodes the image coefficients in a separable wavelet basis: "JPEG 2000, ISO/IEC 15444-1:2000," 2000, the contents of which are incorporated in reference herein. Non-linear noise removal applications have been developed by thresholding the wavelet coefficients of noisy signals in D. Donoho and I. Johnstone, "Ideal spatial adaptation via wavelet shrinkage," Biometrika, vol. 81, pp. 425–455, December 1994, the contents of which are incorporated in reference herein.

To obtain a more sparse representation, foveal procedures gather high resolution data only in the neighborhood of selected points in the image, as described in E. Chang, S. Mallat, and C. Yap, "Wavelet foveation," Applied and Computational Harmonic Analysis, pp. 312–335, 2000, the contents of which are incorporated in reference herein. This information is equivalent to computing wavelet coefficients only in the neighborhood of specific points as shown in the above reference. This strategy is similar to the behavior of a retina, which provides a high resolution measurements where the fovea is centered and a resolution which decreases when the distance to the fovea center increases. Applications to image compressions have also been developed in the above reference by Chang et al.

The main limitation of bases such as wavelet or block cosine bases, currently used for signal representation, is that these bases do not take advantage of the geometrical regularity of many signal structures. Indeed, these bases are composed of vectors having a support which is not adapted to the elongation of the signal structures such as regular edges. Curvelet bases have recently been introduced in E. Candes and D. Donoho, "Curvelets: A surprisingly effective nonadaptive representation of objects with edges," tech. rep., Stanford Univ., 1999, the contents of which are incorporated in reference herein, to take partially advantage of the geometrical regularity of the signal, by using elongated vectors along different directions. Yet, this strategy has not been able to improve results currently obtained with a wavelet basis on natural images, because it does not incorporate explicitly the geometrical information.

To incorporate this geometrical regularity, edge oriented representations have been developed in image processing. An edge detector computes an edge map with discretized differential operators and computes some coefficients in order to reconstruct an approximation of the image grey level between edges. In S. Carlsson, "Sketch based coding of gray level images," IEEE Transaction on Signal Processing, vol. 15, pp. 57–83, July 1988, the contents of which are incorporated in reference herein, an edge detector computes an edge map with discretized derivative operators. For compression applications, chain algorithms are used to represent the chains of edge points with as few bits as possible. The left and right pixel values along the edges are kept and an image is reconstructed from these left and right values with a diffusion process. If all edges were step edges with no noise, this representation would be appropriate but it is rarely the case, and as a result the reconstructed image is not sufficiently close to the original image. An error image is computed and coded with a Laplacian pyramid, but this requires too much bits to be competitive with a procedure such as JPEG-2000.

The above referenced method of Carlsson has been extended in C.-Y. Fu and L. I. Petrich, "Image compression technique." U.S. Pat. No. 5,615,287, the contents of which are incorporated in reference herein, by keeping weighted average values along the left and right sides of the edges. Although the information is different, there is still little information to characterize the image transition when the edge is not a step edge. Another extension of the method of Carlsson has been proposed in D. Geiger, "Image compression method and apparatus." U.S. Pat. No. 5,416,855, the contents of which are incorporated in reference herein. An iterative process defines a set of edge pixels and assigns a value to them. A reconstructed image is then obtained from these values with a diffusion process. This representation can contain more accurate information on the image than that of Carlsson but it then requires many pixels to reconstruct the different types of edges and is therefore not sparse enough.

In S. Mallat and S. Zhong, "Characterization of signals from multiscale edges," IEEE Transactions on Pattern Analysis and Machine Intelligence, vol. 14, no. 7, pp. 710–732, 1992, the contents of which are incorporated in reference herein, a wavelet edge based image representation is computed, which carries more information than the above referenced method of Carlsson. However, this representation requires a different edge map at each scale of the wavelet transform, which is a handicap to produce a sparse representation. In X. Xue, "Image compression based on lowpass wavelet transform and multi-scale edge compensation," in Data Compression Conference, p. 559, 1999, the contents of which are incorporated in reference herein, a multiscale edge map is also computed.

A different strategy is used by several other methods which encode coefficients that represent the image variations in regions between edges as opposed to the image variations across edges. In I. Masaki, U. Desai, A. Chandrakasan, and B. Horn, "Method and apparatus for compressing and decompressing a video image." U.S. Pat. No. 5,790,269, the contents of which are incorporated in reference herein, instead of keeping the image grey levels at the left and right of an edge point, the parameters of a linear regression are kept to approximate the image grey levels along horizontal and vertical lines between two edge points. A similar strategy is used in T. Echigo, J. Maeda, J.-K. Hong, and M. Ioka, "System for and method of processing digital images," U.S. Pat. No. 5,915,046, the contents of which are incorporated in reference herein, where each region is coded using a polygonal surface approximation. In the two above referenced methods, the coefficients are more global and thus less sensitive to noise than the above referenced method of Carlsson but edges are still represented by a discontinuity between two regions.

In A. Mertins, "Image compression via edge-based wavelet transform," Opt. Eng., vol. 38, no. 6, pp. 991–1000, 1999, the contents of which are incorporated in reference herein, the grey level image values are decomposed in a one-dimensional discrete wavelet basis along horizontal or vertical lines between two edge points. In L. Bouchard and R. Askenatis, "Region-based texture coding and decoding method and corresponding system." U.S. Pat. No. 5,898,798, the contents of which are incorporated in reference herein, the image is segmented in regions which are coded independently using a quincunx wavelet transform. In the two above referenced wavelet methods, the whole image information is represented but these procedures do not use the geometrical image regularity to decorrelate the coefficients produced by the image variations on each side of the edges.

Accordingly, there exists a need in the art for improving multi-dimensional signal compression or processing, by computing representations which carry enough information to reproduce all types of edges in images, lead to sparse representations with decorrelation procedures that take advantage of the geometrical signal regularity along edges, and are numerically stable.

SUMMARY OF THE INVENTION

It is an object of this invention to devise a method and means to construct a sparse and stable foveal representation of multi-dimensional (n-dimensional) signals by taking advantage of the regularity of their geometrical structures. It is yet another object of this invention to build a system that compresses signals by quantizing and encoding the coefficients of this sparse foveal representation. Another object of this invention is to remove noise from signals by diagonal processing within this foveal representation. Another object of this invention is to match structures of two different signals by processing their computed foveal representation. Yet another object of this invention is to classify signals by processing their foveal representation.

The invention comprises a foveal trajectory processor that computes foveal coefficients which are inner products of the signal with one-dimensional foveal filters along trajectories, and which specify the signal variations in a sufficiently large neighborhood of the trajectories. The bandelet processor then yields a sparse representation by removing the correlation between foveal coefficients due the geometrical signal regularity. The resulting bandelet coefficients are decomposition coefficients in a basis composed of vectors elongated along trajectories. This representation has therefore the stability property of representations in bases, while having the same geometrical flexibility as edge representations. Similarly to standard foveal algorithms, this approach gathers high resolution image information at specific locations, however, as opposed to existing foveal algorithms, this information is not provided in the neighborhood of isolated points but in the neighborhood of curves or surfaces across the signal.

A trajectory is defined as a discretized surface of dimension n−1 over the signal support. In two dimensions, it is therefore a one-dimensional curve in the image and in three dimensions it is a two-dimensional surface. These trajectories may or may not correspond to the edges of the signal. To structure properly the representation, each trajectory is defined with respect to a particular direction, and each point of this trajectory is specified by a coordinate along this direction. There are n possible orthogonal directions corresponding to the directions of the n-dimensional signal array. The list of trajectories is thus called an n-directional trajectory list.

To compute the foveal coefficients, a set of one-dimensional foveal filters is predefined. Each of these filters is centered along each trajectory, pointing in the direction associated to this trajectory, and the resulting one-dimensional inner products are computed in this direction. At two different positions, the inner products are thus computed with one-dimensional vectors that do not overlap and which are therefore orthogonal. When trajectories are located in the neighborhood of edges, foveal coefficients give a very different representation than what is obtained with existing methods. The foveal filters are chosen in order to characterize the signal variations in a large neighborhood on each side of a trajectory, not just at left and right points as in S. Carlsson, "Sketch based coding of gray level images," IEEE Transaction on Signal Processing, vol. 15, pp. 57–83, July 1988 and C.-Y. Fu and L. I. Petrich, "Image compression technique." U.S. Pat. No. 5,615,287, the contents of which are incorporated in reference herein. Some of these foveal filters have positive and negative coefficients to compute image variations across edges as opposed to weighted averages of grey level values. By choosing foveal filters which are wavelets, a multiscale approximation of the signal transition across the trajectories is obtained.

Foveal wavelet coefficients characterize specifically the image variations across trajectories and not across regular image regions as in L. Bouchard and R. Askenatis, "Region-based texture coding and decoding method and corresponding system." U.S. Pat. No. 5,898,798, in T. Echigo, J. Maeda, J.-K. Hong, and M. Ioka, "System for and method of processing digital images." U.S. Pat. No. 5,915,046, in I. Masaki, U. Desai, A. Chandrakasan, and B. Horn, "Method and apparatus for compressing and decompressing a video image." U.S. Pat. No. 5,790,269 or in A. Mertins, "Image compression via edge-based wavelet transform," Opt. Eng., vol. 38, no. 6, pp. 991–1000, 1999, the contents of which are incorporated in reference herein. As opposed to the wavelet based representation in S. Mallat and S. Zhong, "Characterization of signals from multiscale edges," IEEE Transactions on Pattern Analysis and Machine Intelligence, vol. 14, no. 7, pp. 710–732, 1992 and in X. Xue, "Image compression based on low-pass wavelet transform and multi-scale edge compensation," in Data Compression Conference, p. 559, 1999, the contents of which are incorporated in reference herein, a single trajectory/edge map is used instead of a family of scale dependent edge maps.

The present invention includes a trajectory finder which takes in input the n-dimensional signal and chooses the optimal location of trajectories along which to compute the foveal coefficients. The signal is filtered with one-dimensional convolutions along its lines in each of the n directions, with a set of one-dimensional trajectory filters. In each direction, the trajectory points are located with a one-dimensional energy peak detection along each line. Depending upon the particular choice of foveal filters, the trajectory points may or may not be located at edge points. A chaining procedure computes the resulting set of trajectories in each direction. A non-overlapping partition segments these trajectories to guarantee that different trajectories do not overlap. If the trajectory filters are discretized differential operators, then the trajectory finder is similar to an edge detector such as a Sobel edge detector described in A. Jain, Fundamentals Of Digital Image Processing. Englewood Cliffs: Prentice Hall, 1989 or a Canny edge detector introduced in J. Canny, "A computational approach to edge detection," IEEE Transactions on Pattern Analysis and Machine Intelligence (PAMI), vol. 8, pp. 679–698, 1986. However, for other trajectory filters, the resulting trajectories may not be edges as understood in the usual sense.

The foveal reconstruction processor recovers a signal approximation from the foveal coefficients. This processor computes a reconstructed signal by finding a signal having foveal coefficients close to the provided foveal coefficients, and which is regular away from the trajectories. It is calculated by minimizing a combination of a positive definite constraint functional, vanishing only when the foveal coefficients of the signal are equal to the provided foveal coefficients, and a regularization functional. A foveal residue is computed as a difference between the input signal and the reconstructed foveal signal. The sharp transitions of the input signal along the trajectories have disappeared in the foveal residue, which carries global smooth variations and texture variations in areas not covered by trajectories. The whole signal information is then represented by three components: the n-directional trajectory list, the foveal coefficients that characterize the signal profile along these trajectories, and the residue.

To produce a sparse representation, a bandelet processor decorrelates the foveal coefficients by applying linear invertible operators along each trajectory. Indeed, if a trajectory follows a regular geometric signal structure, then the foveal coefficients have smooth variations along this trajectory and the linear operators take advantage of these smooth variations to perform the decorrelation. For example, these linear operators can be chosen to be decompositions in a cosine basis or in a wavelet basis, defined over the support of the trajectory. The resulting bandelet coefficients are equal to inner products of the signal with n-dimensional bandelet vectors whose supports are elongated along a trajectory. If the linear transform is an orthogonal transform, and the foveal filters are also orthogonal, then the bandelet vectors are orthogonal as well. The resulting representation is therefore perfectly stable. Moreover, along geometrical signal structures most bandelet coefficients have a negligible amplitude and can be set to zero to produce a sparse representation. The inverse bandelet processor recovers the foveal coefficients by performing an inverse bandelet transform using linear operators that are substantially the inverse of those used in the bandelet processor.

A geometric processor also decorrelates the coordinates of each trajectory in an n-directional trajectory list by applying linear invertible operators to these coordinates. These linear operators may be transformation operators in a sine basis or in a wavelet basis. Most of the resulting coefficients then have a negligible amplitude and can be set to zero to obtain a sparse representation. The inverse geometric processor recovers the trajectories by applying linear operators that are substantially the inverse of the linear operators used by the geometric processor.

Signal processing procedures are efficiently implemented in a foveal representation because of its ability to provide representations that are sparse and still accurate when setting their smallest coefficients to zero. A signal compression procedure is implemented by quantizing the bandelet and geometric coefficients and by encoding them for transmission or storage applications. The foveal residue can be compressed with a state of the art transform code such as JPEG-2000 for n=2 dimensional signals. Signal restoration algorithms are implemented by applying linear or non-linear diagonal operators to the bandelet coefficients of this representation, and using a state of the art denoising procedure on the residue. Similarly, this foveal representation reduces computations for classification or matching algorithms by providing a sparse and geometrically oriented representation, on which to apply standard classification or matching techniques.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 1 shows, in block diagram form, an exemplary embodiment of the invention which computes a foveal representation of an n-dimensional signal, processes it and outputs a processed n-dimensional signal.

FIG. 2 illustrates the position of two trajectories over the support of a 2-dimensional digital signal.

FIG. 3 shows, in block diagram form, an exemplary configuration of the trajectory finder.

FIG. 4 gives an example of non-overlapping trajectory partition in 2 dimensions.

FIG. 5 illustrates the trajectory finding process on an image.

FIG. 6a-d shows an image and its reconstruction from its foveal coefficients and the resulting foveal residue.

FIG. 7 shows an image reconstructed from a sparse foveal representation computed by thresholding bandelet coefficients and geometric coefficients.

FIG. 8 gives several examples of bandelets in n=2 dimensions.

FIG. 9 shows an exemplary processor unit (112) for an embodiment of FIG. 1 adapted to noise removal.

FIG. 10 shows in block diagram form an exemplary embodiment of the invention differing from the embodiment of FIG. 1 in that the foveal representation does not contain a foveal residue.

FIG. 11 shows an exemplary processor unit (1010) for an embodiment of FIG. 10 adapted to signal compression.

FIG. 12 shows an exemplary processor unit (112) for an embodiment of FIG. 1 adapted to signal compression.

FIG. 13 shows in block diagram form an exemplary subsystem used for classification and matching.

DETAILED DESCRIPTION

FIG. 1 shows a system exemplifying the present invention. The system takes in input an n-dimensional digitized signal (101), where n is an arbitrary integer larger or equal to 2. It is given by an n-dimensional array of sample values. If n=2, the signal is an image. A trajectory finder (102) chooses trajectories over the n-dimensional support of the signal, along which signal information will be extracted, and outputs an n-directional trajectory list (103). Each trajectory of this list is specified by a direction parameter, a parameter set and coordinates along this parameter set which give the positions of the points of each trajectory. A foveal trajectory processor (104) computes foveal coefficients (105) which are one-dimensional inner products between the n-dimensional signal and translated one-dimensional foveal filters along each trajectory of the trajectory list. These foveal coefficients give information on the signal variations in the neighborhood of each trajectory. The foveal reconstruction processor (106) computes a foveal reconstruction signal from the input foveal coefficients (105) and the n-directional trajectory list (103). This foveal reconstruction signal is computed by minimizing a functional that imposes that it is regular away from the trajectories and that it has foveal coefficients nearly equal to the input foveal coefficients (105). A foveal residue (107) is computed by subtracting the foveal reconstruction signal output by (106) to the n-dimensional input signal (101). FIG. 6 illustrates this processing on a 2-dimensional signal. FIG. 6(a) gives the input 2-dimensional signal (101) and FIG. 6(b) displays the 2-directional trajectory list (103) computed by the trajectory finder (102). The 2-dimensional foveal reconstruction signal computed from the foveal coefficients along this 2-directional trajectory list is shown in FIG. 6(c). The amplitude of the coefficients of the resulting foveal residue (107) is shown in FIG. 6(d). The fact that most points are very dark indicates that the amplitude of the residue is small, compared to the amplitude of coefficients in the original input image (101).

The bandelet processor (108) decorrelates the input foveal coefficients (105) by applying linear invertible operators to these coefficients along each trajectory of the trajectory list. It outputs bandelet coefficients (109) that are equal to inner products between the input signal (101) and n-dimensional bandelet vectors. Similarly, a geometric processor (110) decorrelates the coordinates of the points along the trajectories of the n-directional trajectory list (103) by applying invertible linear operators. It outputs geometric coefficients (111). The signal is thus equivalently represented by geometric coefficients (111) that specify the trajectories, bandelet coefficients (109) that characterize the signal variations in the neighborhood of trajectories, and the foveal residue (107). A processor (112) modifies this representation depending upon the application. For signal compression, the processor comprises a quantization of the coefficients (109) and (111), and an encoding of the resulting quantized coefficients. For noise removal, the processor (112) applies diagonal operators to the coefficients (109) and (111) and a state of the art noise removal operator to the residue (107). For classification, the processor (112) associates a class number to the input coefficients by comparing each of the input (107), (109) and (111) to the characteristics of each class. The processor (112) outputs potentially modified geometric coefficients, bandelet coefficients and a processed foveal residue (113). The inverse geometric processor (114) recovers trajectories from the geometric coefficients by applying linear operators that are the inverse of the ones used in the geometric processor (110) and outputs a processed trajectory list (115). The inverse bandelet processor (116) computes the foveal processed coefficients (117) by applying linear operators that are the inverse of the ones used in the bandelet processor (108). The foveal reconstruction (118) computes a foveal signal reconstruction with the same processor as in (106). This foveal signal reconstruction is added to the processed foveal residue (113) to obtain the output n-dimensional signal (119). The following detailed description gives preferred embodiments of each processor.

n-Directional Trajectory List

The input n-dimensional discrete signal (101) is specified by an array of samples s(m) where m=($m_1$, ..., $m_n$) is an n-dimensional index parameter and each $m_i$ is an integer for $1 \leq i \leq n$.

The position of these samples is represented in $\mathrm{IR}^n$ by associating to each m a vector $$m = \sum_{i=1}^{n} m_i e_i$$

where the family of vectors $\{e_i\}_{1 \leq i \leq n}$ is an orthonormal basis of $\mathrm{IR}^n$. The signal values are thus written s(m) as well as s(m). The signal support in $\mathrm{IR}^n$ is the convex envelope of all m in $\mathrm{IR}^n$ for which the signal value is defined. In 2 dimensions, there are only two directions $e_1$ and $e_2$ which define the signal support, as illustrated in FIG. 2.

The invention extracts signal information along trajectories of an n-directional trajectory list (103). Since there are several trajectories, each one is indexed by an integer j. In n=2 dimensions, a trajectory $t_j$ is a curve of connected discrete samples over the signal support, which is parameterized in a direction orthogonal to a vector $d_j$ which is either $e_1$ or $e_2$. Each parameter is an integer $p \in S_j = [b_j, b_j+l_j]$ to which corresponds a coordinate $c_j(p)$ in the direction $d_j$ which may take any real number value. If $d_j = e_1$ then this curve is composed of points whose positions are $c_j(p)$ $e_1 + p e_2$ in $\mathrm{IR}^2$ and if $d_j = e_2$ then this curve is composed of points whose coordinates are $p e_1 + c_j(p) e_2$ in $\mathrm{IR}^2$. FIG. 2. shows two trajectories (1) and (2) whose directions are respectively $e_1$ and $e_2$. The trajectory points are illustrated by "crosses" which are linked by dashed lines. In n=2 dimensions, a trajectory curve is therefore defined by its direction $d_j$, its connected discrete parameter set $S_j$ and its coordinates in the direction $d_j$ $$t_j = \{d_j, S_j, c_j\}. \qquad (1)$$

This definition of trajectory is now extended to any dimension n for n-directional trajectory lists. A trajectory $t_j$ of such a list is a surface of co-dimension 1, of connected discrete samples over the signal support. It is defined with respect to a direction $d_j=e_1$ of the sampling grid of the signal for some $1 \leq l \leq n$. Each point of the trajectory is parameterized by an n−1 dimensional parameter $$p=\{p_i\}_{1 \leq i \leq n, i \neq l} \in S_j \qquad (2)$$

where each $p_i$ is an integer and $S_j$ is a connected discrete set. To each $p \in S_j$ corresponds a point in the trajectory whose coordinate in the direction $d_j=e_1$ is $c_j(p)$. Over the signal support, the trajectory thus corresponds to the set of points whose coordinates are $\Sigma_{i \neq l} p_i e_i + c_j(p) e_1$. Like in 2 dimensions, a trajectory is defined by its direction $d_j$, its connected parameter set $S_j$ and its coordinates in the direction $d_j$ $$t_j=\{d_j, S_j, c_j\}. \qquad (3)$$

There are several standard definitions of connectivity for a discrete set on an n−1 dimensional integer grid. For example, two parameters p and p' are said to be connected if only one of their coordinate is different and differs by at most 1. Another weaker definition imposes only that all the coordinates of p and p' differ by at most 1. Any connectivity definition may be used to define the sets $S_j$ of trajectories. In a preferred embodiment, the invention uses the second weaker definition.

In a preferred embodiment of the present invention, the n-directional trajectory list is computed from the input n-dimensional digitized signal (101), with the trajectory finder (102), which computes trajectories along which the foveal coefficients (105) carry an important part of the energy of the signal variations. The foveal trajectory processor (104) which computes the foveal coefficients (105) is thus described first and the detailed description of the trajectory finder (102) is given afterwards.

Foveal Trajectory Processor

A foveal trajectory processor (104) takes in input an n-dimensional signal (101) and an n-directional trajectory list (103). It computes foveal coefficients (105), which are one-dimensional inner-products between the input signal (101) and a predefined set of filters, that are centered along the trajectories.

To the coordinate c of any trajectory point, a foveal trajectory processor associates a family of K translated discrete foveal filters $\{f_k(q-c)\}_{q \in \mathbb{Z}}$ for $1 \leq k \leq K$. Each filter indexed by k has a compact support included in $[c+\alpha_k, c+\beta_k]$. The computation of these translated discrete foveal filters is described at the end of the section, with several examples.

For a trajectory $t_j=\{d_j, S_j, c_j\}$ of the n-directional trajectory list (103), a foveal trajectory processor (104) computes a foveal coefficient at a point parameterized by $p \in S_j$ of coordinate $c_j(p)$ and for a filter index $1 \leq k \leq K$, with a one-dimensional inner product in the direction of $d_j$ between the signal and the discrete filter $f_k(q-c_j(p))$ translated by $c_j(p)$. For n=2 dimensions, there are only two directions. If $d_j=e_1$ then the corresponding foveal coefficient in (105) is computed by a sum over integers q:

$$F(j, p, k) = \sum_{\alpha_k+c_j(p) \leq q \leq \beta_k+c_j(p)} s(qe_1 + pe_2) f_k(q-c_j(p)). \qquad (4)$$

If $d_j=e_2$ then $$F(j, k, p) = \sum_{\alpha_k+c_j(p) \leq q \leq \beta_k+c_j(p)} s(pe_1 + qe_2) f_k(q-c_j(p)). \qquad (5)$$

In general, for any integer $n \geq 2$, we call l (where $1 \leq l \leq n$) the direction index such that $d_j=e_1$. The corresponding foveal coefficient in (105) is computed by a sum over integers q:

$$F(j, k, p) = \sum_{\alpha_k+c_j(p) \leq q \leq \beta_k+c_j(p)} s\left(\sum_{i \neq l} p_i e_i + q e_l\right) f_k(q-c_j(p)). \qquad (6)$$

The output of the foveal trajectory processor (104) is the list of all computed foveal coefficients F(j,k,p) in (105).

$\lambda \geq 0$ is a predefined support fraction parameter. The support condition imposes that foveal coefficients F(j,k,p) in (105) are computed for all j, all $p \in S_j$ and all $1 \leq k \leq K$ such that at least a fraction $\lambda$ of the one-dimensional support of the foveal filter $f_k(q-c_j(p))$ in the direction $d_j$ does not intersect another trajectory.

In two dimensions, if $d_j=e_1$, the support condition means that F(j,k,p) is calculated only if the line segment $xe_1+pe_2$ where x is a real number in the interval $[c_j(p)+\lambda\alpha_k, c_j(p)+\lambda\beta_k]$ does not intersect another trajectory curve $t_{j'}$ with $j' \neq j$. This means that that there is no point $x_1e_1+x_2e_2$ of a trajectory $t_{j'}$ such that $x_1 \in [c_j(p)+\lambda\alpha_k, c_j(p)+\lambda\beta_k]$ and $|x_2-p| \leq 1$. Otherwise F(j,k,p)=nil, where nil is a predefined symbol. If $d_j=e_2$ then F(j,k,p) is calculated only if the line segment of all points $pe_1+xe_2$ where $x \in [c_j(p)+\lambda\alpha_k, c_j(p)+\lambda\beta_k]$ does not intersect another trajectory curve $t_{j'}$ with $j' \neq j$. This means that there is no point $x_1e_1+x_2e_2$ of a trajectory $t_{j'}$ such that $x_2 \in [c_j(p)+\lambda\alpha_k, c_j(p)+\lambda\beta_k]$ and $|x_1-p| \geq 1$. Otherwise F(j,k,p)=nil.

For an n-dimensional signal, the support condition is expressed as follows. Let $1 \leq l \leq n$ be the direction index such that $d_j=e_1$. The foveal coefficient F(j,k,p) with $p=\{p_i\}_{1 \leq i \leq n, i \neq l} \in S_j$ is calculated only if for all $j' \neq j$ there is no trajectory point of coordinate $$\sum_{i=1}^{n} x_i e_i$$

in $t_{j'}$ such that $x_1 \in [c_j(p)+\lambda\alpha_k, c_j(p)+\lambda\beta_k]$ and for all $1 \leq i \leq n$ with $i \neq l$, $|x_i-p_i| \geq 1$. Otherwise F(j,k,p)=nil. If $\lambda=0$ then the foveal coefficients F(j,k,p) are computed for all trajectory indices j, for all $p \in S_j$ and all $1 \leq k \leq K$.

The foveal trajectory processor (104) computes for each trajectory coordinate c a family of K discrete foveal filters $\{f_k(q-c)\}_{q \in \mathbb{Z}}$ having a support included in $[c+\alpha_k, c+\beta_k]$, for $1 \leq k \leq K$. For all c, the $\{f_k(q-c)\}_{q \in \mathbb{Z}}$ specify the variations of the signal in a sufficiently large neighborhood. For each c there is at least one k such that the support of the discrete filter $\{f_k(q-c)\}_{q \in \mathbb{Z}}$ is larger or equal than 3 and typically much larger to gather information in a sufficiently large neighborhood. Moreover the invention imposes that at least one filter of support larger or equal to 3 has strictly positive and strictly negative coefficients $f_k(q-c)$ so that the inner product with the signal gives an information about the signal variations in the neighborhood of c. Finally, to gather enough information on the signal variations across the trajectory point, the total number of filters K should be larger or equal to 3, and it is most often much larger.

In a first embodiment, the foveal trajectory processor (104) computes translated discrete foveal filters $\{f_k(q-c)\}_{q \in \mathbb{Z}}$ for each trajectory coordinate c, with K continuous parameter foveal filters which associate to any input real parameter x a value $f_k(x)$, with $f_k(x) \neq 0$ only if $x \in [\alpha_k, \beta_k]$ for $1 \leq k \leq K$.

A plurality of continuous parameter foveal filters may be chosen. A non-restrictive list of examples is given below. Cosine foveal filters are defined by cosine functions for $K \geq 3$:

$$\forall x \in \left[-\frac{K}{2}, \frac{K}{2}\right) f_k(x) = \gamma_k \sqrt{\frac{2}{K}} \cos\left(\frac{(k-1)\pi}{K}\left(x + \frac{K+1}{2}\right)\right) \text{ for } 1 \leq k \leq K \quad (7)$$

with $\gamma_1 = 2^{-1/2}$ and $\gamma_k = 1$ for $k > 1$ and $f_k(x) = 0$ if $x \geq K/2$ or $x < -K/2$.

Wavelet foveal filters are obtained from L compactly supported mother-wavelets $\psi^l(x)$, which are defined as functions such that $\int \psi^l(x)dx = 0$ for $1 \leq l \leq L$ and L' compactly supported scaling functions $\phi^l(x)$, which are defined as functions such that $\int \phi^l(x)dx \neq 0$ for $1 \leq l \leq L'$, where L and L' are arbitrary integers. The maximum number of scales is an integer J. The indicator function of the interval [0,1] is written $1_{[0,1]}$. Wavelets and scaling functions are dilated to produce $\psi_J^l(x) = \sqrt{2^{-J}} \psi^l(2^{-J}x)$ and $\phi_J^l(x) = \sqrt{2^{-J}} \phi^l(2^{-J}x)$. For $1 \leq j \leq J$ and $1 \leq l \leq L$ the filters can be defined by the convolution product with the indicator function of [0,1]:

$$f_k(x) = \psi_j^l * 1_{[0,1]}(x) \text{ for } k = (j-1)L + l. \quad (8)$$

If $\psi^l(x)$ has a zero average, observe that it is also the case for any discrete filter $\{f_k(q-c)\}_{q \in \mathbb{Z}}$. For $1 \leq l \leq L'$ non-zero average foveal filters are defined from scaling functions by:

$$f_k(x) = \phi_J^l * 1_{[0,1]}(x) \text{ for } k = JL + l. \quad (9)$$

Wavelet filters have supports of size proportional to the scale $2^j$. If the support fraction parameter $\lambda$ is non-zero then foveal coefficients are computed for filter indices corresponding to wavelets up to a maximum scale limited by the distance of the closest trajectories. This maximum scale may be smaller than $2^J$. In a preferred implementation of wavelet foveal filters, to avoid having no average information along a trajectory $t_j$, for each parameter $p \in S_j$ and for each scaling function $\phi^l$, the scale $2^J$ of the non-zero average foveal filters corresponding to scaling functions in (9) is replaced by the largest possible scale $2^{J_1}$ such that a fraction $\lambda$ of the one-dimensional support of the resulting filter $f_k(q-c_j(p))$ in the direction $d_j$ does not intersect another trajectory. The corresponding foveal filters is defined by:

$$f_k(x) = \phi_{J_1}^l * 1_{[0,1]}(x) \text{ for } k = JL + l. \quad (10)$$

Even/Odd mother wavelets are particular families of wavelets defined from an even scaling function $\phi(x) = \phi(-x)$ of compact support such that $\int \phi(x)dx \neq 0$ and which satisfies for some integer $r \geq 0$ $$\forall x \in \mathbb{R}, \sum_{j=-\infty}^{+\infty} 2^{-mj} \phi(2^j x) = \eta_m x^m \text{ for } 1 \leq m \leq r \quad (11)$$

where $\eta_m$ is constant for each m. Even/Odd mother wavelets are respectively defined by $$\psi^1(x) = (\phi(x) - \phi(2x))\text{sign}(x) \quad (12)$$

and $$\psi^2(x) = \phi(x) - 2\phi(2x). \quad (13)$$

For $1 \leq k \leq 2J$ the corresponding foveal filters are defined by (8) and a single scaling function $\phi^1 = \phi$ adds another foveal filter with (9) or (10).

Left/Right mother wavelets are particular families of wavelets defined by $$\psi^1(x) = (\phi(x) - \phi(2x))1_{(-\infty,0]}(x) \quad (14)$$

and $$\psi^2(x) = (\phi(x) - 100 \ (2x))1_{[0,+\infty)}(x). \quad (15)$$

For $1 \leq k \leq 2J$ the corresponding foveal filters are defined by (8). The two scaling functions $\phi^1(x) = \phi(x)1_{(-\infty,0]}(x)$ and $\phi^2(x) = \phi(x)1_{[0,+\infty)}(x)$ add two other filters with (9) or (10).

In another preferred embodiment of the foveal trajectory processor (104), continuous parameter foveal filters $f_k(x)$ are computed with an interpolation of discrete foveal filters $\{f_k(q)\}_{q \in \mathbb{Z}}$ of compact support defined for integer values q. These discrete filters are interpolated using an interpolation function $\phi(x)$ of compact support [a,b] which satisfies $\phi(0) = 1$ and $\phi(q) = 0$ if $q \in \mathbb{Z}$ and $q \neq 0$. Examples of such interpolation functions are the Deslauriers-Dubuc interpolation functions. Each translated discrete filter is then defined by $$f_k(q-\tau) = \sum_{p=\alpha_k}^{\beta_k} f_k(p)\phi(q-\tau-p). \quad (16)$$

For Deslauriers-Dubuc interpolation functions, the calculation of (16) is performed with an iterative interpolation procedure explained in S. Mallat, A Wavelet Tour of Signal Processing, 2nd edition. Academic Press, San Diego, 1999.

The discrete foveal filters can be chosen to be discrete wavelets, or discrete wavelet packets, which are calculated with a filter bank described in S. Mallat, A Wavelet Tour of Signal Processing, 2nd edition. Academic Press, San Diego, 1999, or discrete multiwavelets described in J. Geronimo, D. Hardin, and P. R. Massopust, "Fractal functions and wavelet expansions based on several scaling functions," J. Approx. Theory, vol. 78, pp. 373–401, 1994. For example, a discrete wavelet basis is computed from discrete wavelets $\psi_j(p)$ whose support are proportional to $2^j$, and from a discrete scaling signal $\phi_J(p)$ whose support is proportional to $2^J$. The corresponding discrete foveal filters can be defined by selecting only L translated wavelets at each scale:

$$f_k(p) = \psi_j(p - 2^j l) \text{ for } -L/2 \leq l < L/2 \text{ and } k = (j-1)L + l + L/2 \quad (17)$$

and L translated scaling signal at the coarsest scale $$f_k(p) = \phi_J(p - 2^J l) \text{ for } -L/2 \leq l < L/2 \text{ and } k = JL + l + L/2. \quad (18)$$

In a preferred embodiment, the scale $2^J$ of $\phi_J$ is adapted along each trajectory and replaced by the largest possible scale $2^{J_1}$ such that a fraction $\lambda$ of the one-dimensional support of the resulting filters $f_k(q-c_j(p))$ in the direction $d_j$ does not intersect another trajectory.

In another preferred embodiment, the foveal trajectory processor (104) computes translated filters by quantizing the trajectory coordinate and translating a predefined family of discrete filters. The quantization parameter r is an integer. For each $1 \leq k \leq K$ and each $-r/2 \leq m < r/2$, a discrete filter of compact support $\{f_k^m(q)\}_{q \in \mathbb{Z}}$ is predefined. For any real number x we write î=round(x) the smallest integer such that $|\hat{i}-x| \leq \frac{1}{2}$. We write ĉ=round(rc)/r the quantized value of a coordinate c, which is an $r^{th}$ fraction of an integer. It can be written ĉ=c̄+m/r with c̄∈ℤ and $-r/2 \leq m < r/2$. If c is an $r^{th}$ fraction of an integer then ĉ=c. The translated discrete filter at c is then defined by $$f_k(q-c) = f_k^m(q-\bar{c}). \qquad (19)$$

Trajectory Finder

The trajectory finder (102) computes the n-directional trajectory list (103) with a predefined set of trajectory filters. It takes in input an n-dimensional signal (101). The predefined set of discrete trajectory filters corresponds to compactly supported filters $\{\hat{f}_k(p)\}_{1 \leq k \leq \hat{K}}$ defined for integers p with $\hat{f}_k(p) \neq 0$ only if $\hat{\alpha}_k \leq p \leq \hat{\beta}_k$. In a preferred embodiment, the trajectory finder (102) computes trajectories along which the foveal coefficients (105) carry a large portion of the energy of the signal variations. In a preferred embodiment of the trajectory finder (102), the family of trajectory filters $\hat{f}_k$ is chosen to be the subset of the foveal filters used by the foveal trajectory processor (104), which have a zero average:

$$\sum_p \hat{f}_k(p) = 0.$$

For the cosine foveal filters defined in (7), the corresponding discrete cosine filters are:

$$\forall p \in \left[-\frac{K}{2}, \frac{K}{2}\right], \qquad (20)$$

$$\hat{f}_k(p) = \gamma_k \sqrt{\frac{2}{K}} \cos\left(\frac{k\pi}{K}\left(p + \frac{K+1}{2}\right)\right) \text{ for } 1 \leq k < K$$

with $\gamma_1 = 2^{-1/2}$ and $\gamma_k = 1$ for k>1 and $\hat{f}_k(p) = 0$ if $p \geq K/2$ or $p < -K/2$. Observe that the number of filter $\hat{K}$ is equal to K−1 because the cosine vector for a zero frequency k=0 is not included. When the foveal trajectory transform uses foveal filters obtained with wavelets in (8) and scaling functions in (9), all filters in (9) are excluded because they have a non-zero average.

The different steps of a trajectory finder (102) are illustrated in FIG. 3. It takes in input an n-dimensional signal (301) and performs one-dimensional convolutions of this signal along its lines in each of the n directions in (302). In (303), a one-dimensional local maxima detection is done on an energy computed at the output of these one-dimensional convolutions. This produces trajectory points in each direction. The chaining process in (304) finds for each direction the connected components $S_j$ among the trajectory points. A procedure in (305) integrates these connected components to obtain a final partition of connected components $S_j$ which do not overlap. It outputs the n-directional trajectory list (306).

For each $1 \leq k \leq K$, the filtering (302) computes one-dimensional discrete convolutions along each direction of the input signal (301) s(m) for $$m = \sum_{i=1}^{n} m_i e_i.$$

For each $1 \leq l \leq n$, each $1 \leq k \leq K$ and each $$m = \sum_{i=1}^{n} m_i e_i$$

over the input signal support the processor (302) computes $$s_{l,k}(m) = \sum_{\hat{\alpha}_k + m_l \leq q \leq \hat{\beta}_k + m_l} s\left(\sum_{i \neq l} m_i e_i + q e_l\right) \hat{f}_k(q - m_l). \qquad (21)$$

These one-dimensional convolutions are computed either with a direct summation or with a state of the art fast block convolution transform using an FFT, as described for example in S. Mallat, A Wavelet Tour of Signal Processing, 2nd edition. Academic Press, San Diego, 1999, depending upon the size $\hat{\beta}_k - \hat{\alpha}_k$ of the support of $\hat{f}_k$.

The energy peak detection in (303) is computed with a local maxima operator over an energy measurement computed on the output of (302). An energy measurement $E(\{a_k\}_{1 \leq k \leq \hat{K}})$ is associated to a vector of $\hat{K}$ coefficients. A preferred embodiment of this invention uses a square Euclidean norm:

$$E(\{a_k\}_{1 \leq k \leq \hat{K}}) = \sum_{k=1}^{\hat{K}} |a_k|^2. \qquad (22)$$

Modifications of this energy formula can be made by anyone skilled in the art. The trajectory filter energy is calculated along all lines in each direction for $1 \leq l \leq n$ and each m:

$$\epsilon_l(m) = E(\{s_{l,k}(m)\}_{1 \leq k \leq \hat{K}}). \qquad (23)$$

The local maxima detector depends upon two specified parameters: a and $T_3$. It takes any one-dimensional signal z(p), finds all m where z(p) is maximum over [m−a,m+a] and above the threshold $T_3$:

$$z(m) = \max_{-a \leq p \leq a} \{z(m+p)\} \text{ and } |z(m)| \geq T_3. \qquad (24)$$

For each such m, the local maxima procedure computes the position y=m+τ of the maxima of a curve which interpolates the values of z(m−1), z(m) and z(m+1). In a preferred embodiment, this interpolation is performed with a parabola and hence:

$$\tau = \frac{z(m+1) - z(m-1)}{2(z(m+1) - 2z(m) + z(m-1))}. \qquad (25)$$

If τ=½ then the processor sets m=m+1 and τ=−½.

The direction is specified by the parameter l where $1 \leq l \leq n$. For each $p_i$ for i≠l fixed, $z(p) = \epsilon_l(\Sigma_{i \neq l} p_i e_i + p e_l)$ is a one-dimensional signal depending upon p. The local maxima operator is applied to this one-dimensional signal. Each local maxima located at y defines a trajectory point whose position is $\Sigma_{i \neq l} p_i e_i + y e_l$. This procedure computes all trajectory points in the direction l. This is done for all $1 \leq l \leq n$.

The chaining procedure (304) is performed independently in each direction indexed by $1 \leq l \leq n$. It chains two trajectory parameters $\Sigma_{i \neq l} p_i e_i + y e_l$ if they are neighbors in the following sense. First, the two points $\{p_i\}_{1 \leq i \leq n, i \neq l}$ and $\{p'_i\}_{1 \leq i \leq n, i \neq l}$ must be different and connected. Any definition of connectivity may be used but it must be specified. In a preferred embodiment, two different parameters are said to be connected only if $|p_i-p'_i| \leq 1$ for all i. Second, they must satisfy $|y-y'|<a$. Finally, the neighborhood condition imposes that for y=round(y) and y'=round(y') the output of the trajectory filters is close $$E\left(\left\{s_{l,k}\left(\sum_{i \neq l} p_i e_i + y e_l\right) - s_{l,k}\left(\sum_{i \neq l} p_i e_i + y' e_l\right)\right\}_{1 \leq k \leq \hat{K}}\right) \leq T_4 \quad (26)$$

where $T_4$ is a specified threshold.

The chaining of a trajectory $\hat{t}_j$ is initiated from any initial trajectory point $\Sigma_{i \neq l} p_i e_i + y e_l$ that has not been marked. This point is marked and the procedure initializes $\hat{S}_j$ to the single parameter element $p=\{p_i\}_{1 \leq i \leq n, i \neq l}$ with $c_j(p)=y$. Then for all neighbors $\Sigma_{i \neq l} p'_i e_i + y' e_l$ that are not marked, if $p'=\{p'_i\}_{1 \leq i \leq n, i \neq l} \notin \hat{S}_j$ then p' is added to $\hat{S}_j$ with $c_j(p')=y'$ and this point is marked. Each new chained point is used as a seed to continue recursively the chaining of the trajectory. The resulting set $\hat{S}_j$ is connected. For 2-dimensional signals, each trajectory point that is not the initial trajectory point has at most one neighbor. This chaining defines curves in the image plane.

Optionally, a non-overlapping partition (305) is computed. Two points $x=\Sigma_i x_i e_i$ and $x'=\Sigma_i x'_i e_i$ are said to overlap if $$\max_{1 \leq i \leq n}(|x_i - x'_i|) \leq 1. \quad (27)$$

Two trajectories t and t' are said to overlap if they include two points x and x' which overlap. A trajectory t is included in a trajectory t' if all points of t overlap with a point of t'. The non-overlapping partition process (305) takes in input an n-directional trajectory list $\{\hat{t}_j\}_j$ and outputs an n-directional trajectory list (306) $\{t_j\}_j$ with no overlapping and which covers the same domain. For each j a trajectory $t_j$ is included in one trajectory $\hat{t}_j$ and does not overlap with $t_k$ for all j and k. Moreover, each point of a trajectory $\hat{t}_j$ overlaps with at least one point of a trajectory $t_k$.

In dimension n=2, a preferred embodiment of the non-overlapping partition (305) is implemented as follows. In this case there are two directions $d_j=e_1$ or $d_j=e_2$ and the trajectories are one-dimensional chains. The procedure traverses the list of trajectories and considers each $\hat{t}_j$, until there is no more. There are three cases.

If $\hat{t}_j$ is included in a trajectory $\hat{t}_k$ in the list then $\hat{t}_j$ is removed from the list.

If $\hat{t}_j$ overlaps with a trajectory $\hat{t}_k$ having a different direction, then the procedure traverses $\hat{t}_j$ beginning from a point which does not overlap any point of $\hat{t}_k$ until it reaches consecutive points where both trajectories overlap. Among these consecutive points, a breaking point is selected. In a preferred embodiment, this point is the one where the trajectory filter energies in the directions $d_j$ and $d_k$ have the closest values. The trajectory $\hat{t}_j$ is removed from the trajectory list and it is partitioned in two trajectories. The first trajectory corresponds to all points of $\hat{t}_j$ before the breaking point and the second trajectory corresponds to all points of $\hat{t}_j$ after the breaking point. Both of these trajectories are added to the trajectory list.

If $\hat{t}_j$ overlaps with no other trajectories $\hat{t}_k$ then it is added to the output trajectory list.

This procedure is illustrated in FIG. 4. The chains of direction $e_1$ are shown as full lines and the chains of direction $e_2$ as dashed line. The trajectory (1) is included in the trajectory (2) and is therefore removed. The trajectory (3) overlaps the trajectory (2) and a breaking point is selected in (a). It also overlaps the trajectory (4) and a second breaking point is defined in (b).

FIG. 5 gives an example of trajectory finding (102) on a 2-dimensional signal. In this case, there are two trajectory filters which are even/odd foveal wavelets. The filtering is performed along the lines and columns of the image and the energy peak detection outputs foveal trajectories in the corresponding two directions. These are integrated by the non-overlapping partition procedure. For this particular choice of trajectory filters, the resulting trajectories are located in the neighborhood of what can be perceived as the "edges" of the image. This is not necessarily the case for other trajectory filters.

It should be noted that in n=2 dimensions, if there is $\hat{K}=1$ trajectory filter $f_1(q)$, which is a discretized derivative $f_1(q)=(\delta(q)-\delta(q-1))/2$, then the trajectory finder (102) implements an edge detector similar to a Sobel edge detector described in A. Jain, Fundamentals Of Digital Image Processing. Englewood Cliffs: Prentice Hall, 1989. For other trajectory filters such as discretized partial derivatives of Gaussians, the trajectory finder is similar to a Canny edge detector introduced in J. Canny, "A computational approach to edge detection," IEEE Transactions on Pattern Analysis and Machine Intelligence, vol. 8, pp. 679–698, 1986. In the present invention, the foveal trajectory finder is computed with trajectory filters which may have very different properties, such as cosine vectors, which are adapted to the choice of the foveal filters. The resulting trajectories thus do not always correspond to perceived edges in images.

Foveal Reconstruction Processor

The foveal reconstruction processor (106) takes in input an n-directional trajectory list (103) and foveal coefficients (105), from which it reconstructs a foveal reconstruction signal, given the predefined family of foveal filters. This foveal reconstruction signal has nearly the same foveal coefficients as the input foveal coefficients (105) and has smooth variations away from the trajectories.

Each foveal coefficient $F(j,k,p)$ is computed in (6) as a one-dimensional inner product between the signal s and a translated foveal filter. To simplify notations, we write $$F(j,k,p) = \sum_{\alpha_k + c_j(p) \leq q \leq \beta_k + c_j(p)} s\left(\sum_{i \neq l} p_i e_i + q e_l\right) f_k(q - c_j(p)) = \langle s, f_{j,k,p} \rangle_1 \quad (28)$$

with $f_{j,k,p}(q) = f_k(q - c_j(p))$. These one-dimensional inner products give a partial information about the signal s which specifies its profile values along trajectories, but it provides no information away from these trajectories. As a consequence, there is an infinite set of n-dimensional signals s such that for all j, p∈$S_j$ and filter indices k:

$$\langle s, f_{j,k,p} \rangle_1 = F(j,k,p). \quad (29)$$

The n-dimensional inner product between two n-dimensional signals $s_1$ and $s_2$ is written:

$$\langle s_1, s_2 \rangle_n = \sum_{m \in \mathbb{Z}^n} s_1(m) s_2(m). \tag{30}$$

The foveal reconstruction (106) imposes a regularity condition outside the location of trajectories by minimizing a regularization functional. In a preferred embodiment of this processor, the foveal reconstruction (106) computes the n-dimensional signal $\hat{s}(m)$ by minimizing a quadratic penalized functional over all n-dimensional signals $g(m)$ having the same support as $s(m)$:

$$\hat{s} = \arg \min_g \left\{ \sum_{j,k,p} |\langle g, f_{j,k,p} \rangle_1 - \langle s, f_{j,k,p} \rangle_1|^2 + \sum_l \langle MC_l g, MC_l g \rangle_n \right\} \tag{31}$$

where $C_l$ are n-dimensional convolutions operators $(C_l g)(m) = g * c_l(m)$ typically obtained by discretizing partial differential operators, and M is a multiplicative operator defined by $$(Mg)(m) = a(m)g(m) \tag{32}$$

where $a(m)$ is a weighting mask.

The first sum in (31) imposes that the foveal coefficients of s and g are nearly equal, and the second sum is a regularization term. The convolution operators $C_l$ may be chosen to be a discretization of any Tykhonov regularization operator. In a preferred embodiment, $C_l$ is a discretization of a partial derivative in the direction of $e_l$. In its simplest form it is calculated with a finite difference:

$$(C_l g)(m) = g\left( \sum_{i=1}^n m_i e_i \right) - g\left( \sum_{i=1}^n m_i e_i - e_l \right). \tag{33}$$

If, among $$\sum_{i=1}^n m_i e_i$$

and $$\sum_{i=1}^n m_i e_i - e_l,$$

one is within the boundary of the support of the input signal s but not the other, the boundary condition is set to be $(C_l g)(m) = 0$. Any other discretization of a derivative, with finite difference or finite elements, may be used as well, with zero boundary conditions.

The weighting mask $a(m)$ of the operator M in (32) is typically a small parameter which may vary to impose different regularizations in different zones of the signal. In a first embodiment, $a(m) = \epsilon$ is a constant for all m. In a second embodiment $a(m)$ is adapted to the n-directional trajectory list in order to perform the regularization only sufficiently far away from the trajectories. The processor sets $a(m) = 0$ if there is a trajectory point whose distance to m is smaller than a threshold $T_1$. The processor (106) sets $a(m) = \epsilon > 0$ if the distances of m to all trajectory points are larger than a second threshold $T_2 > T_1$. For all other points m, the value $a(m)$ is calculated with a weighted averaging of neighborhood points where $a(m)$ takes the values 0 or $\epsilon$, so that the resulting $a(m)$ has smooth transitions from 0 to $\epsilon$. Other adaptations of $a(m)$ may be used as well in the present invention.

A solution $\hat{s}$ of (31) is obtained by computing the solution of a linear system. We denote by $O^*$ the adjoint of an operator O. R, $P_f$ and L are the operators defined over n-dimensional signals g by $$Rg = \sum_l C_l^* MM C_l g, \tag{34}$$

$$P_f g = \sum_{j,k,p} \langle g, f_{j,k,p} \rangle_1 f_{j,k,p} \tag{35}$$

$$Lg = Rg + P_f g \tag{36}$$

and the n-dimensional signal h defined from the input signal s by $$h = P_f s = \sum_{j,k,p} \langle s, f_{j,k,p} \rangle_1 f_{j,k,p} = \sum_{j,k,p} F(j,k,p) f_{j,k,p} \tag{37}$$

A solution $\hat{s}$ of (31) is solution of the corresponding linear system $$L\hat{s} = h. \tag{38}$$

The foveal reconstruction processor (106) computes the solution of this linear system with an iterative method such as a stationary iterative method, a preconditioned conjugate gradient method or a multigrid method, all described in G. Meurant, Computer Solution of Large Linear System. Studies in Mathematics and its Applications, North Holland, 1999. A standard termination criteria such as a prescribed number of iterations is used to stop the iterations.

The stationary iterative method is chosen as either a Gauss-Seidel, a symmetric Gauss-Seidel, a successive over relaxation or a symmetric successive over relaxation method of Chapter 5 in G. Meurant, Computer Solution of Large Linear System. Studies in Mathematics and its Applications, North Holland, 1999. In a first embodiment, the method is used to solve the system (38).

In a preferred embodiment, the iterative method is a preconditioned conjugate gradient as defined in C. T. Kelley, Iterative Methods for Linear and Nonlinear Equations, Frontiers in Applied Mathematics, SIAM, 1995. This method can be implemented with a preconditioner designed as a diagonal operator in a wavelet basis introduced in S. Jaffard, "Wavelet methods for fast resolution of elliptic problem," SIAM J. Numer. Anal., vol. 29, pp. 965–986, 1992 or designed as cycle of a multigrid method where the relaxation method is a symmetric successive over relaxation method as described in O. Tatebe, "The multigrid preconditioned conjugate gradient method," in Proceedings of Sixth Copper Mountain Conference on Multigrid Methods, pp. 621–634, 1993.

In another embodiment, the iterative method is a multigrid method as described in W. L. Briggs, A Multigrid Tutorial, SIAM, 1987. The relaxation method used can be a stationary iterative method, such as a symmetric successive over relaxation method, or a conjugate gradient method. In a preferred embodiment, the multigrid method is a full multigrid method where the relaxation method is a conjugate gradient.

FIG. 6(c) shows an example of 2-dimensional reconstruction from foveal coefficients computed along the 2-directional trajectory list in FIG. 6(b), with even/odd foveal wavelets. This example of reconstruction is performed with regularization convolution operators which are the finite difference approximations (33) of the partial derivatives in the direction $e_1$ and $e_2$.

Bandelet Processor

A bandelet processor (108) transforms the input foveal coefficients (105) F(j,k,p) with linear operators to decorrelate their values. For j and k fixed and $p \in S_j$ is written $F_{j,k}(p)=F(j,k,p)$. When the n-dimensional input signal (101) includes regular geometrical structures and the trajectories of n-directional trajectory list (103) are along these structures, then $F_{j,k}(p)$ has smooth variations when p varies. For each j and k, $S_{j,k}$ is the set of all $p \in S_j$ for which $F(j,k,p) \neq$ nil. This corresponds to the foveal coefficients that have been computed with the support condition. If the support fraction parameter $\lambda$ used by the foveal trajectory processor (104) is $\lambda=0$ then $S_{j,k}=S_j$ otherwise it may be different.

For j and k fixed, $F_{j,k}(p)$ is a vector of values defined over $S_{j,k}$. A bandelet processor (108) is implemented by using a linear invertible operator $O_{j,k}$ that transforms any vector defined over $S_{j,k}$ into a vector defined over $S_{j,k}$. For all j and k, the bandelet processor (108) computes:

$$\forall p \in S_{j,k}, B(j,k,p)=O_{j,k}(F_{j,k})(p). \tag{39}$$

These bandelet coefficients (109) are n-dimensional inner products between the original signal s(m) and a bandelet vector $b_{j,k,p}(m): B(j,k,p) = <s, b_{j,k,p}>_n$. The support of the bandelet vector $b_{j,k,p}(m)$ is elongated along the trajectory and has a width in the direction $d_j$ equal to the support size $\beta_k - \alpha_k$ of the foveal filters $\{f(q-c)\}_{q \in \mathbb{Z}}$. The foveal trajectory processor (104) together with the bandelet processor (108) implement a fast separable algorithm to compute the inner products of the image with the bandelet vectors. If the foveal filters are orthogonal and the operator $O_{j,k}$ is an orthogonal operator than for a fixed trajectory index j, the bandelet vectors $\{b_{j,k,p}\}_{k,p}$ are orthogonal. For parameters that are not in $S_{j,k}$ the bandelet processor (108) sets the bandelet coefficients (109):

$$\forall p \in S_j - S_{j,k}, B(j,k,p) = \text{nil}. \tag{40}$$

The inverse bandelet processor (116) recovers foveal coefficients from bandelet coefficients, with the inverse of the linear operators used to compute by the bandelet processor (108). For j and k fixed and $p \in S_j$ we write $B_{j,k}(p) = B(j,k,p)$. For each j and k, the inverse bandelet processor recovers $S_{j,k}$ as the set of all $p \in S_j$ for which $B(j,k,p) \neq$ nil. $O_{j,k}^{-1}$ is the inverse of the operator $O_{j,k}$. For all j and k, the inverse bandelet processor computes $$\forall p \in S_{j,k}, F(j,k,p)=O_{j,k}^{-1}(B_{j,k})(p), \tag{41}$$

and $$\forall p \in S_j - S_{j,k}, F(j,k,p) = \text{nil}. \tag{42}$$

A preferred embodiment of the bandelet processor (108) and its inverse (116) is obtained by choosing an operator $O_{j,k}$ which is an n-dimensional discrete wavelet transform implemented over the set $S_{j,k}$. This wavelet transform and its inverse $O_{j,k}^{-1}$ can be implemented with a fast lifting scheme as described in W. Sweldens, "The lifting scheme: A construction of second generation wavelets," SIAM J. Math. Anal., vol. 29, no. 2, pp. 511–546, 1997 and J. Kovacevic and W. Sweldens, "Wavelet families of increasing order in arbitrary dimensions," IEEE Trans. Image Proc., vol. 9, pp. 480–496, March 2000, or with an in-place fast n-dimensional wavelet filter-bank transform and its inverse described in J. Li and S. Lei, "Arbitrary shape wavelet transform with phase alignment," in Proceedings of ICIP'98, 1998.

Examples of embodiments of the bandelet processor (108) and its inverse (116) are now given for 2-dimensional signals. In this case, the sets $S_j$ are intervals $[b_j, b_j+l_j]$. For any integer $M \geq 0$ we denote by $\hat{O}_M$ an invertible operator defined over vectors y(m) for $0 \leq m < M$. This invention includes a plurality of choices for $\hat{O}_M$. The first one is a discrete cosine transform defined by $$(\hat{O}_M y)(m) = \lambda_m \sqrt{\frac{2}{M}} \sum_{p=1}^{M} y(p)\cos\left(m\pi \frac{p+1/2}{M}\right) \text{ for } 0 \leq m < M \tag{43}$$

with $\lambda_m=1$ if $m \neq 0$ and $\lambda_0=2^{-1/2}$. In this case $\hat{O}_M y$ is computed with a fast discrete cosine transform algorithm. An exemplary implementation is described in H. S. Malvar, Signal Processing with Lapped Transforms. Boston, Mass., USA: Artech House, 1992. The operator $\hat{O}_M$ may also be a discrete lapped cosine transform whose implementation is described in the above reference of Malvar. The operator $\hat{O}_M$ may also be a biorthogonal or an orthogonal discrete wavelet transform or a discrete wavelet packet transform, computed with a fast filter bank algorithm using finite impulse perfect reconstruction filters, as described in S. Mallat, A Wavelet Tour of Signal Processing, 2nd edition. Academic Press, San Diego, 1999. FIG. 8 displays bandelet vectors $b_{j,k,p}$ along a particular trajectory shown in black, computed with foveal filters corresponding to left/right mother wavelets, and operators $\hat{O}_M$ which are discrete wavelet transforms. The resulting bandelets have a support located either on the left or on the right of the trajectory, with a width and a length that depend upon k and p.

If the support fraction parameter $\lambda$ is not zero then for each j and k, $F_{j,k}(l)$ may have nil values which indicate that the corresponding coefficients have not been calculated. The bandelet processor (108) defines the sub-arrays $F_{j,k}^q(l)$ corresponding to the largest successive intervals $[\gamma_q, \eta_q]$ of l where $F_{j,k}(l) \neq$ nil:

$$F_{j,k}^q(l)=F_{j,k}(l+\gamma_q) \neq \text{nil for } 0 \leq l \leq \gamma_q - \eta_q. \tag{44}$$

Their length is $l_{j,q}=\eta_q-\gamma_q+1$. Each of them is transformed with the operator $\hat{O}_{l_{j,q}}$ to compute the bandelet coefficients (109):

$$B(j,k,\gamma_q+m)=(\hat{O}_{l_{j,q}} F_{j,k}^q)(m) \text{ for } 0 \leq m < l_{j,q} \tag{45}$$

For each q and $m \in [\eta_q+1, \gamma_{q+1}-1]$ the processor (108) sets B(j,m,k)=nil. Hence B(j,k,p)=nil if and only if F(j,k,p)=nil.

The inverse bandelet processor (116) recovers F(j,k,p) from B(j,k,p). $\hat{O}_M^{-1}$ is the inverse of the operator $\hat{O}_M$. If $\hat{O}_M$ is a DCT then its inverse is computed with a fast IDCT algorithm, as described for example in H. S. Malvar, Signal Processing with Lapped Transforms. Boston, Mass., USA: Artech House, 1992. If $\hat{O}_M$ is a discrete biorthogonal or an orthogonal wavelet transform or a discrete wavelet packet transform then its inverse is implemented with a fast filter bank algorithm as described for example in S. Mallat, A Wavelet Tour of Signal Processing, 2nd edition. Academic Press, San Diego, 1999. The inverse bandelet processor (108) defines the sub-arrays $B_{j,k}^q(m)$ corresponding to the largest successive intervals $[\gamma_q, \eta_q]$ of m where $B_{j,k}(m)=B(j,k,m) \neq$ nil:

$$B_{j,k}^q(m)=B_{j,k}(m+\gamma_q) \neq \text{nil for } 0 \leq m \leq \gamma_q - \eta_q. \qquad (46)$$

Their length is $l_{j,q}=\eta_q-\gamma_q+1$. Each of them is transformed with the operator $\hat{O}_{l_{j,q}}^{-1}$ to compute the output foveal coefficients:

$$F(j,k,\gamma_q+l)=(\hat{O}_{l_{j,q}}^{-1} B_{j,k}^q)(l) \text{ for } 0 \leq l < l_{j,q} \qquad (47)$$

For each q and $p \in [\eta_q+1, \gamma_{q+1}-1]$ the processor sets $F(j,k,p)=$nil.

Geometric Processor

The geometric processor (110) transforms the coordinates of the trajectories of the input n-directional trajectory list (103) with linear operators that decorrelate these coordinates. For each trajectory $t_j=\{d_j, S_j, c_j\}$ of the n-directional trajectory list (103), the geometric processor (110) is implemented by using an arbitrary linear invertible operator $O_j$ that transforms any vector defined over $S_j$ into a vector defined over $S_j$. For all j, the geometric processor in (110) computes:

$$\forall p \in S_j, \; g_j(p)=O_j(c_j)(p). \qquad (48)$$

We denote by $\hat{t}_j$ the transformed representation of a trajectory $t_j$, which gives the transformed geometric coefficients (111):

$$\hat{t}_j=\{d_j, S_j, g_j\}. \qquad (49)$$

$O_j^{-1}$ is the inverse of $O_j$. The inverse geometric processor (114) recovers the trajectory $t_j$ from $\hat{t}_j$. For all j, the inverse geometric processor (114) computes $$\forall p \in S_j, \; c_j(p)=O_j^{-1}(g_j)(p). \qquad (50)$$

A preferred embodiment of the geometric processor (110) and its inverse (114) is obtained by choosing an operator $O_j$ which is an n-dimensional discrete wavelet transform implemented over the set $S_j$. This wavelet transform and its inverse $O_j^{-1}$ can be implemented with a fast lifting scheme as described in W. Sweldens, "The lifting scheme: A construction of second generation wavelets," SIAM J. Math. Anal., vol. 29, no. 2, pp. 511–546, 1997 and J. Kovacevic and W. Sweldens, "Wavelet families of increasing order in arbitrary dimensions," IEEE Trans. Image Proc., vol. 9, pp. 480–496, March 2000, or with a fast in-place n-dimensional wavelet filter-bank transform and its inverse described in J. Li and S. Lei, "Arbitrary shape wavelet transform with phase alignment," in Proceedings of ICIP'98, 1998.

Preferred embodiments of the geometric processor (110) and its inverse (114) are now given for 2-dimensional signals. In this case, the sets $S_j$ are intervals $[b_j, b_j+l_j]$. The geometric processor (110) subtracts the straight line that joins both points for $1 \leq l < l_j$ $$\hat{c}_j(l) = c_j(l+b_j) - c_j(b_j) - l \frac{c_j(l_j+b_j) - c_j(b_j)}{l_j} \qquad (51)$$

so that $\hat{c}_j(0)=\hat{c}_j(l_j)=0$.

For any integer $M \geq 0$, $\hat{O}_M$ is an invertible operator defined over vectors y(m) for $1 \leq m \leq M$. This invention includes a plurality of choice of $\hat{O}_M$. An example is a discrete sine transform defined by $$(\hat{O}_M y)(m) = \sqrt{\frac{2}{M}} \sum_{p=1}^{M} y(p) \sin\left(m \pi \frac{p}{M+1}\right) \text{ for } 1 \leq m \leq M. \qquad (52)$$

In this case $\hat{O}_M$ is computed with a fast discrete sine transform algorithm (DST) and its inverse $\hat{O}_M^{-1}$ is implemented with a fast inverse discrete sine transform (IDST), as described for example in H. S. Malvar, Signal Processing with Lapped Transforms. Boston, Mass., USA: Artech House, 1992. The operator $\hat{O}_M$ may also be a discrete lapped sine transform, whose implementation with its inverse are described in the above reference of Malvar. The operator $\hat{O}_M$ may also be a biorthogonal or an orthogonal discrete wavelet transform or a discrete wavelet packet transform, computed with a fast filter bank algorithm using finite impulse perfect reconstruction filters, as described for example in S. Mallat, A Wavelet Tour of Signal Processing, 2nd edition. Academic Press, San Diego, 1999. In this case, the inverse $\hat{O}_M^{-1}$ is also computed with a fast filter bank algorithm described in the above reference of Mallat. Yet another embodiment of the processors (110) and (114) consists in choosing an operator $\hat{O}_M$ which is a wavelet interpolation transform, implemented with a fast lifting scheme with the fast lifting implementation described in W. Sweldens, "The lifting scheme: A construction of second generation wavelets," SIAM J. Math. Anal., vol. 29, no. 2, pp. 511–546, 1997, whose inverse $\hat{O}_M^{-1}$ is implemented with a fast inverse lifting as described in the above reference.

The geometric processor (110) transforms the vector $\hat{c}_j$ for $1 \leq l \leq l_j-1$ of size $l_j-1$ with the operator $\hat{O}_{l_j-1}$ and computes the geometric coefficients:

$$g_j(k)=(\hat{O}_{l_j-1} \hat{c}_j)(k) \text{ for } 1 \leq k \leq l_j-1 \qquad (53)$$

and sets $g_j(0)=c_j(b_j)$ and $g_j(l_j)=c_j(b_j+l_j)$. The inverse geometric processor (114) recovers the original trajectory representation from $\hat{t}_j$ by computing $$\hat{c}_j(l)=(\hat{O}_{l_j-1}^{-1} g_j)(l) \text{ for } 1 \leq l \leq l_j-1 \qquad (54)$$

and $$c_j(l+b_j) = \hat{c}_j(l) + g_j(0) + l \frac{g_j(l_j) - g_j(0)}{l_j} \text{ for } 1 \leq l \leq l_j - 1 \qquad (55)$$

and $c_j(b_j)=g_j(0)$, $c_j(b_j+l_j)=g_j(l_j)$. This inverse geometric process (114) thus recovers $t_j=\{d_j, S_j, c_j\}$ from $\hat{t}_j$.

Noise Removal System

A noise removal system is implemented with a noise removal processor in (112). To remove additive noise, the present invention uses a sparse representation approach which sets to zero the small bandelet coefficients (109) and the small geometric coefficients in (111). This can be done by applying diagonal operators to these coefficients.

In the context of the present invention, a diagonal operator applied to bandelet coefficients B(j,k,p) computes $\theta_{j,k,p}(B(j,k,p))$ where $\theta_{j,k,p}(x)$ is a linear or non-linear function. The function $\theta_{j,k,p}$ can be chosen to be a thresholding function. A hard thresholding function is defined by $\theta_{j,k,p}=\rho_{T_{j,k,p}}$ where $T_{j,k,p}$ is a threshold value and $$\rho_T(x) = \begin{cases} x & \text{if } |x| \geq T \\ 0 & \text{if } |x| < T \end{cases}. \qquad (56)$$

A soft thresholding function is $\theta_{j,k,p} = \hat{\rho}_{T_{j,k,p}}$ where $T_{j,k,p}$ is a threshold value and $$\hat{\rho}_T(x) = \begin{cases} x - T\,\text{sign}(x) & \text{if } |x| \geq T \\ 0 & \text{if } |x| < T \end{cases}. \quad (57)$$

A diagonal operator applied to the geometric coefficients $g_j(p)$ of a trajectory $\hat{t}_j$ at the output (111) of the geometric processor (110) computes $\theta_{j,p}(g_j(p))$ where $\theta_{j,p}(x)$ is a linear or non-linear function. As an example this function may be a thresholding function $\theta_{j,p} = \rho_{T_{j,p}}$ or $\theta_{j,p} = \hat{\rho}_{T_{j,p}}$ where $T_{j,p}$ is a threshold value.

Thresholding bandelet and geometric coefficients yield a sparse representation. As an example, FIG. 7 shows a processed image reconstructed from the system of FIG. 1, by implementing a thresholding of the bandelet coefficients and of the geometric coefficients in the processor (112). Only 6% of the bandelet coefficients and 12% of the geometric coefficients are non-zero and yet using the foveal residue the output reconstructed 2-dimensional signal is of very good visual quality compared to the input 2-dimensional signal shown in FIG. 6(a).

A preferred embodiment of the noise removal processor (112) is illustrated in FIG. 9. Each bandelet coefficient B(j,k,p) in (901) is thresholded in (902) with a threshold $T_{j,k,p}$ that is adapted to the nature of the noise. The geometric coefficients in (904) are also thresholded in (905) with a threshold $T_{j,p}$ adapted to the noise. The foveal residue (907) is processed with any state-of-the-art noise removal procedure. Examples of state-of-the-art linear or thresholding estimators are described in S. Mallat, A Wavelet Tour of Signal Processing, 2nd edition. Academic Press, San Diego, 1999. In a preferred embodiment, this noise removal is implemented by applying an invertible linear transform (908) and thresholding the output coefficients in (909). A processed residue is recovered in (911) by applying the inverse linear transform in (910). The linear transform in (908) may be a decomposition in a separable wavelet packet basis implemented with a fast separable filter bank algorithm. This wavelet packet basis may be a wavelet basis. The inverse wavelet packet transform in (910) is also implemented with a fast separable filter bank algorithm, as described in the above reference of Mallat. At the output of the processor (112), the n-dimensional output signal (119) is restored from the processed residue (113) and the thresholded bandelet and geometric coefficients, using the inverse bandelet processor (116), the inverse geometric processor (114), and the foveal reconstruction (118) processors, as illustrated in FIG. 1.

Signal Compression System

A first signal compression procedure is implemented as a system of FIG. 10 which is a simplification of the system of FIG. 1, which does not comprise the computation and processing of a foveal residue. The input n-dimensional signal (1001) is processed by a trajectory finder (1002) which computes an n-directional trajectory list (1003). A foveal trajectory processor (1004) computes foveal coefficients (1005) and a bandelet processor (1006) computes bandelet coefficients (1007). A geometric processor (1008) transforms the n-directional trajectory list (1103) and computes geometric coefficients (1009). The bandelet coefficients (1007) and the geometric coefficients (1009) are handled by the processor (1010) for encoding, transfer or storage and decoding. This processor is described in further details in FIG. 11. The decoder computes processed foveal coefficients (1014) at the output of an inverse bandelet processor (1013) and a processed trajectory list at the output of an inverse geometric processor (1011). The foveal reconstruction processor (1015) computes the n-dimensional output signal (1016).

In FIG. 11, the bandelet coefficients (1101) and geometric coefficients (1102) coefficients are quantized by the quantizers (1103) and (1104), and encoded for storage or transmission by encoder (1105) to produce a multiplexed compressed data stream. This data stream is then stored or transmitted over (1106), decoded by (1107) that outputs the quantized bandelet coefficients (1108) and the quantized geometric (1109) coefficients. In a preferred embodiment, the quantizers (1103) and (1104) are chosen to be scalar quantizers, and thus diagonal operators over bandelet and geometric coefficients. The binary coder (1105) is an entropy coder such as a Huffman coder or an arithmetic coder described in T. M. Cover and J. A. Thomas, Elements of Information Theory. Wiley Series in Telecommunications, John Wiley & Sons, 1991.

In yet another embodiment of a signal compression processor, the system of FIG. 1 is used to incorporate a foveal residue (107) which is coded together with the bandelet coefficients (109) and the geometric coefficients (111) by the processor (112). The computations of the coding processor (112) are illustrated in FIG. 12.

The bandelet coefficients (1201) and the geometric coefficients (1202) coefficients are respectively quantized by the quantizers (1205) and (1206). The foveal residue (1203) is transformed by an invertible linear operator (1204), and the output is quantized in (1207).

The quantized bandelet coefficients, the quantized geometric coefficients and the quantized transform of the foveal residue are encoded by the encoder (1208) into a compressed multiplexed data stream suitable for storage or transmission. The resulting data stream is then either stored in or transmitted over (1209) and decoded by the decoder (1210). This decoder recovers the quantized bandelet coefficients (1211), the quantized geometric coefficients (1212) and the quantized transformed coefficients of the foveal residue (1213). The inverse transform block (1213) implements a transform that is substantially the inverse of that implemented in (1204), and recovers a processed foveal residue (1214). The transform (1204), the quantizer (1207) and the encoder (1208) implement a state-of-the-art transform coder. In a preferred embodiment, this transform coder decomposes the signal in a separable wavelet basis and performs the quantization and coding of the coefficients. For 2-dimensional signals, a JPEG 2000 transform code may be used, as described in "JPEG 2000, ISO/IEC 15444-1:2000," 2000. The quantized bandelet coefficients (1211), the quantized geometric coefficients (1212) and the processed foveal residue (1214) correspond to the output of the processor (112) of FIG. 1. An n-dimensional output signal (119) is then computed by the processors of FIG. 1.

To optimize this n-dimensional signal compressor, in a preferred embodiment of this signal compression system, the trajectory finder (102) selects the trajectories along which the signal energy is coded with less bits with quantized bandelet coefficients (1211) and quantized geometric coefficients (1212) than with the quantized transformed coefficients of the foveal residue (1214), for a given distortion on the output signal (119).

Signal Matching System

Sparse representations lead to efficient matching between signals since these signals are now characterized by much fewer coefficients than originally. A foveal representation gives geometric trajectories and descriptors along these geometric trajectories that describe the signal variations.

Algorithms have been developed to match signals from such representations and perform classification. In n=2 and n=3 dimensions, such algorithms are developed in the field of computer vision for example in H. G. Barrow, J. M. Tenenbaum, R. C. Bolles, and H. C. Wolf, "Parametric correspondence and chamfer matching: Two new techniques for image matching," in Proc. 5th Int. Joint Conf. Artificial Intelligence, pp. 659–663, 1977 or in G. Barequet and M. Sharir, "Partial surface and volume matching in three dimensions," IEEE Transactions on Pattern Analysis and Machine Intelligence, vol. 19, 1997.

To match two input signals $s_1$ and $s_2$ these signals are transformed by the processors of FIG. 13. Each of these signals is transformed as an n-dimensional input signal in (1301). A trajectory finder (1302) computes an n-directional trajectory list (1303) for each of them and a foveal trajectory processor (1304) computes the foveal coefficients (1305) associated to the n-directional trajectory list of each of the two signals. A matching processor (1306) takes in input the n-directional trajectory list and the foveal coefficients of the signal $s_1$ and the n-directional trajectory list and the foveal coefficients of the signal $s_2$. The matching processor (1306) optimizes a partial mapping which associates to each trajectory point of $s_1$ at most one trajectory point of $s_2$ while making sure that no two trajectory points of $s_1$ match the same trajectory point of $s_2$. This partial mapping can be computed by minimizing a global energy functional which includes a distance between the foveal coefficients close to any of two matched trajectory points of $s_1$ and $s_2$, along their respective trajectory.

Classification System

A signal classification processor is implemented with the system of FIG. 13. A finite family of classes $\{C_i\}_{1 \leq i \leq l}$ is defined. The classification processor in (1306) takes in input the n-directional trajectory list (1303) of a signal and its foveal coefficients (1305). It associates a class index to this input by analyzing the geometry of the trajectories and the values of foveal coefficients along these trajectories. For n=2 this is performed by state-of-the art pattern recognition algorithms in images, which use edge and geometrical image structures.

While a detailed description of presently preferred embodiments of the invention has been given above, various alternatives, modifications, and equivalents will be apparent to those skilled in the art. For example, while different components of the foveal trajectory and foveal reconstruction processors of the present invention are described herein as performing certain specific functions, one skilled in the art will appreciate that other components or circuits in the service module may perform some or all of such functions without varying from the spirit of the invention. Therefore, the above description should not be taken as limiting the scope of the invention which is defined by the appended claims.

We claim:

1. A method for processing an n-dimensional digital input signal, comprising the steps of:
   a. receiving an n-dimensional digital input signal; and
   b. receiving an n-directional trajectory list, comprising a plurality of trajectories, wherein each of said trajectories includes a direction information, a connected parameter set information, and coordinate information of one or more trajectory points defined over said parameter set; and
   c. foveal trajectory processing each of said trajectory points in each trajectory of said n-directional trajectory list by:
      i. computing at least three translated discrete foveal filters with the coordinate of said trajectory point, where at least one translated discrete foveal filter has a support size larger or equal to three, and has at least one positive coefficient and one negative coefficient; and
      ii. computing foveal coefficients as the one-dimensional inner products between said n-dimensional digital input signal in the direction of said trajectory and each of said translated discrete foveal filters satisfying a support condition.

2. The method of claim 1, wherein said support condition imposes for each of said translated discrete foveal filters that at least a fraction $\lambda$ of its support in the direction of said trajectory does not intersect any other trajectory of said n-directional trajectory list, where $\lambda \geq 0$ is a predefined support fraction parameter.

3. The method of claim 1, wherein said translated discrete foveal filters are computed with continuous parameter foveal filters.

4. The method of claim 3, wherein said continuous parameter foveal filters are cosine functions.

5. The method of claim 3, wherein said continuous parameter foveal filters are wavelet foveal filters obtained by dilating mother wavelets with a plurality of dilation factors and dilating scaling functions with a single scale factor for each.

6. The method of claim 5, wherein said mother wavelets are even/odd mother wavelets.

7. The method of claim 5, wherein said mother wavelets are left/right mother wavelets.

8. The method of claim 3, wherein said continuous parameter foveal filters are computed with an interpolation procedure of discrete foveal filters.

9. The method of claim 8, wherein said interpolation procedure is computed with Deslauriers-Dubuc interpolation functions.

10. The method of claim 8, wherein said discrete foveal filters are discrete wavelets for a plurality of scales and a plurality of translations and discrete scaling filters at one scale for each said scaling filter and for a plurality of translations.

11. The method of claim 8, wherein said discrete foveal filters are discrete wavelet packets.

12. The method of claim 5, wherein for each trajectory point of said n-directional trajectory list, each of said scaling functions is dilated by a scale that is adapted to be small enough to satisfy said support condition.

13. The method of claim 10, wherein for each trajectory point of said n-directional trajectory list, the scale of each said discrete scaling filters is adapted to be small enough to satisfy said support condition.

14. The method of claim 2, wherein said translated discrete foveal filters are computed with a quantized trajectory point coordinate, where said quantized trajectory point coordinate is computed by quantizing said coordinate of said trajectory point to an integer multiple of a fixed fraction of an integer.

15. A foveal reconstruction method for computing an n-dimensional digital signal called foveal reconstruction signal, comprising the steps of:
   a. receiving input foveal coefficients; and
   b. receiving an n-directional trajectory list, comprising a plurality of trajectories, wherein each of said trajectories includes a direction information, a connected parameter set information, and coordinate information of one or more trajectory points defined over said parameter set; and c. computing said foveal reconstruction signal by minimizing together
    i. a regularization functional enforcing smoothness of said foveal reconstruction signal away from said trajectories; and
    ii. the differences between said input foveal coefficients and reconstructed foveal coefficients, wherein said reconstructed foveal coefficients are computed for each of said trajectory points in each trajectory of said n-directional trajectory list by:
        A. computing at least three translated discrete foveal filters with the coordinate of said trajectory point, where at least one translated discrete foveal filter has a support size larger or equal to three, and has at least one positive coefficient and one negative coefficient; and
        B. computing the one-dimensional inner product between said foveal reconstruction signal in the direction of said trajectory and each of said translated discrete foveal filters satisfying a support condition.

16. The method of claim 15, wherein said foveal reconstruction signal is computed by minimizing a quadratic functional, said quadratic functional being the sum of
    a. a regularization functional defined as the sum of the squared norms of components obtained by multiplying with weighting masks the convolution of said foveal reconstruction signal with predefined regularization filters; and
    b. a quadratic distance between said input foveal coefficients and said reconstructed foveal coefficients.

17. The method of claim 16, wherein said regularization filters are discrete approximations of partial first order derivatives along each of the n directions of said foveal reconstruction signal.

18. The method of claim 16, wherein the linear system corresponding to the minimization of said quadratic functional is solved by an iterative algorithm.

19. The method of claim 18, wherein said linear system is solved with a stationary iterative method.

20. The method of claim 19, wherein said stationary iterative method is the symmetric successive over relaxation method.

21. The method of claim 18, wherein said linear system is solved with a preconditioned conjugate gradient method.

22. The method of claim 21, wherein the preconditioner in said preconditioned conjugate gradient method is a diagonal operator in a wavelet basis.

23. The method of claim 21, wherein the preconditioner in said preconditioned conjugate gradient method is a multigrid method where the relaxation method is the symmetric successive over relaxation method.

24. The method of claim 18, wherein said iterative algorithm is implemented with a multigrid method.

25. The method of claim 24, wherein said multigrid method is a full multigrid cycle where the relaxation method is a conjugate gradient method.

26. The method of claim 24, wherein said multigrid method is a multigrid method where the relaxation method is a stationary iterative method.

27. The method of claim 26, wherein said stationary iterative method is the symmetric successive over relaxation method.

28. The method of claim 1, further comprising a bandelet processing step, consisting of computing bandelet coefficients for decorrelating said foveal coefficients by applying an invertible linear operator on each vector of said foveal coefficients computed with said translated discrete foveal filters corresponding to the same foveal filter translated along the same trajectory.

29. The method of claim 28, wherein said linear operators are discrete wavelet transforms.

30. The method of claim 28, wherein n=2 and said linear operators are implemented with discrete cosine transforms (DCT) applied on all largest intervals of consecutive said foveal coefficients computed with said translated discrete foveal filters satisfying said support condition and corresponding to the same foveal filter translated along the same trajectory.

31. The method of claim 28, wherein n=2 and said linear operators are implemented with discrete wavelet transforms applied on all largest intervals of consecutive said foveal coefficients computed with said translated discrete foveal filters satisfying said support condition and corresponding to the same foveal filter translated along the same trajectory.

32. The method of claim 28, wherein n=2 and said linear operators are implemented with discrete wavelet packet transforms applied on all largest intervals of consecutive said foveal coefficients computed with said translated discrete foveal filters satisfying said support condition and corresponding to the same foveal filter translated along the same trajectory.

33. The method of claim 1, further comprising a geometric processing step consisting of computing geometric coefficients for decorrelating the coordinates of points along each trajectory of said n-directional trajectory list, by applying invertible linear operators on the vectors of said coordinates along each said trajectory.

34. The method of claim 33, wherein said linear operators are discrete wavelet transforms.

35. The method of claim 33, wherein n=2 and said linear operators are implemented with discrete sine transforms (DST).

36. The method of claim 33, wherein n=2 and said linear operators are implemented with discrete wavelet transforms.

37. The method of claim 1, wherein said n-directional trajectory list is determined by performing prior to said foveal trajectory processing the further steps of:
    a. filtering each line of said input signal in each of the n directions of its sampling grid with a plurality of predefined trajectory filters; and
    b. detecting one-dimensional local maxima for each of the n directions, along each line of said input signal, of an energy computed from outputs of said filtering;
    c. and chaining independently neighbor trajectory points in each of the n directions into n-directional trajectories.

38. The method of claim 37, wherein said trajectory filters are a subset of said foveal filters.

39. The method of claim 37 further comprising the step of performing a non-overlapping partition of said n-directional trajectories.

40. The method of claim 37 wherein n=2.

41. The method of claim 28, further comprising a geometric processing step consisting of computing geometric coefficients for decorrelating the coordinates of points along each trajectory of said n-directional trajectory list, by applying invertible linear operators on the vectors of said coordinates along each trajectory.

42. The method of claim 28, further comprising prior to said bandelet processing the steps of computing a foveal reconstruction signal by minimizing together
    a. a regularization functional enforcing smoothness of said foveal reconstruction signal away from said trajectories; and b. the differences between said foveal coefficients and reconstructed foveal coefficients, wherein said reconstructed foveal coefficients are computed for each trajectory point in each trajectory of said n-directional trajectory list as the one-dimensional inner products between said foveal reconstruction signal in the direction of said trajectory and each of said translated discrete foveal filters satisfying a support condition;

c. and of computing a foveal residue by subtracting from said n-dimensional digital input signal said foveal reconstruction signal.

43. The method of claim 41, further comprising prior to said bandelet processing the steps of computing a foveal reconstruction signal by minimizing together a. a regularization functional enforcing smoothness of said foveal reconstruction signal away from said trajectories; and b. the differences between said foveal coefficients and reconstructed foveal coefficients, wherein said reconstructed foveal coefficients are computed for each trajectory point in each trajectory of said n-directional trajectory list as the one-dimensional inner products between said foveal reconstruction signal in the direction of said trajectory and each of said translated discrete foveal filters satisfying a support condition;

c. and of computing a foveal residue by subtracting from said n-dimensional digital input signal said foveal reconstruction signal.

44. The method of claim 28, further comprising the step of applying diagonal operators on said bandelet coefficients.

45. The method of claim 41, further comprising the steps of a. applying diagonal operators on said bandelet coefficients, and b. applying diagonal operators on said geometric coefficients.

46. A method of claim 44 for removing noise from said input signal wherein said diagonal operators are thresholding operators.

47. A method of claim 45 for removing noise from said input signal wherein said diagonal operators are thresholding operators.

48. A method of claim 42 for removing noise from said input signal further comprising the steps of a. applying a noise removal operator to said foveal residue to obtain a denoised residue; and b. applying thresholding operators on said bandelet coefficients to compute thresholded bandelet coefficients; and c. computing processed foveal coefficients by applying an inverse bandelet transform on said thresholded bandelet coefficients; and d. computing a denoised foveal reconstruction by performing a foveal reconstruction on said processed foveal coefficients and said n-directional trajectory list; and e. adding said denoised residue to said denoised foveal reconstruction to output an n-dimensional denoised signal.

49. The method of claim 48, wherein said noise removal operator is a thresholding operator in a wavelet packet basis.

50. The method of claim 49, wherein n=2.

51. A method of claim 28 for compressing said n-dimensional digital input signal further comprising the steps of:

a. quantizing said bandelet coefficients to produce quantized bandelet coefficients and encoding said quantized bandelet coefficients to obtain a data stream suitable for storage in a storage medium; and b. storing said data stream on said storage medium; and c. decoding said data stream to recover said quantized bandelet coefficients.

52. A method of claim 28 for compressing said n-dimensional digital input signal further comprising the steps of:

a. quantizing said bandelet coefficients to produce quantized bandelet coefficients and encoding said quantized bandelet coefficients to obtain a data stream suitable for transmission over a communication medium; and b. transmitting said data stream over said transmission medium; and c. decoding said data stream to recover said quantized bandelet coefficients.

53. A method of claim 41 for compressing said n-dimensional digital input signal further comprising the steps of:

a. quantizing said bandelet coefficients and said geometric coefficients to produce quantized bandelet coefficients and quantized geometric coefficients, and encoding said quantized bandelet coefficients and said quantized geometric coefficients to obtain a data stream suitable for storage in a storage medium; and b. storing said data stream on said storage medium; and c. decoding said data stream to recover said quantized bandelet and said quantized geometric coefficients.

54. A method of claim 41 for compressing said n-dimensional digital input signal further comprising the steps of:

a. quantizing said bandelet coefficients and said geometric coefficients to produce quantized bandelet coefficients and quantized geometric coefficients, and encoding said quantized bandelet coefficients and said quantized geometric coefficients to obtain a data stream suitable for transmission over a communication medium; and b. transmitting said data stream over said transmission medium; and c. decoding said data stream to recover said quantized bandelet and said quantized geometric coefficients.

55. A method of claim 43 for compressing said n-dimensional digital input signal further comprising the steps of:

a. quantizing said bandelet coefficients and said geometric coefficients to produce quantized bandelet coefficients and quantized geometric coefficients; and b. transform coding and quantizing said foveal residue to obtain quantized transform coded coefficients; and c. encoding said quantized bandelet coefficients, said quantized geometric coefficients and said quantized transform coded coefficients to obtain a data stream suitable for storage in a storage medium; and d. storing said data stream on said storage medium; and e. decoding said data stream to recover said quantized bandelet coefficients, said quantized geometric coefficients and said quantized transform coded coefficients.

56. A method of claim 43 for compressing said n-dimensional digital input signal further comprising the steps of:

a. quantizing said bandelet coefficients and said geometric coefficients to produce quantized bandelet coefficients and quantized geometric coefficients; and b. transform coding and quantizing said foveal residue to obtain quantized transform coded coefficients; and c. encoding said quantized bandelet coefficients, said quantized geometric coefficients and said quantized transform coded coefficients to obtain a data stream suitable for transmission over a communication medium; and d. transmitting said data stream over said transmission medium; and e. decoding said data stream to recover said quantized bandelet coefficients, said quantized geometric coefficients and said quantized transform coded coefficients.

57. The method of claim 55, wherein n=2.

58. The method of claim 57, wherein said transform coding decomposes said foveal residue in a separable wavelet basis.

59. The method of claim 58, wherein said n-directional trajectory list is a set of trajectories along which the signal energy is coded more efficiently with said quantized bandelet coefficients and said quantized geometric coefficients than with said quantized transform coded coefficients.

60. The method of claim 56, wherein n=2.

61. The method of claim 60, wherein said transform coding decomposes said foveal residue in a separable wavelet basis.

62. The method of claim 61, wherein said n-directional trajectory list is a set of trajectories along which the signal energy is coded more efficiently with said quantized bandelet coefficients and said quantized geometric coefficients than with said quantized transform coded coefficients.

63. A signal matching method of claim 1 further comprising the step of finding a partial mapping between said n-directional trajectory list and a second n-directional trajectory list, by minimizing a global energy functional comprising a distance between said foveal coefficients and a second set of foveal coefficients.

64. The signal matching method of claim 63, wherein n=2.

65. The method of claim 1, further comprising the step of computing a class number from said n-directional trajectory list and said foveal coefficients.

66. The classification method of claim 65, wherein n=2.

67. The method of claim 15, wherein said input foveal coefficients are computed prior to said foveal reconstruction with an inverse bandelet processing step of applying linear operators to input bandelet coefficients.

68. The method of claim 15, wherein said n-directional trajectory list is computed prior to said foveal reconstruction with an inverse geometric processing step, of applying linear operators to input geometric coefficients of trajectories.

69. The method of claim 15, further comprising the step of adding to said foveal reconstruction signal an input residual signal.

70. The method of claim 68, wherein said input foveal coefficients are computed prior to said foveal reconstruction with an inverse bandelet processing step, of applying linear operators to input bandelet coefficients.

71. The method of claim 67, further comprising the step of adding to said foveal reconstruction signal an input residual signal.

72. The method of claim 70, further comprising the step of adding to said foveal reconstruction signal an input residual signal.

73. An apparatus for processing an n-dimensional digital input signal, comprising:

a. a first input interface for receiving an n-dimensional digital input signal;

b. a second input interface for receiving an n-directional trajectory list, comprising a plurality of trajectories, wherein each of said trajectories includes a direction information, a connected parameter set information, and coordinate information of one or more trajectory points defined over said parameter set; and c. a foveal trajectory processor, coupled to said first and said second input interfaces, for computing at least three translated discrete foveal filters from said received n-directional trajectory list with the coordinate of said trajectory point, where at least one translated discrete foveal filter has a support size larger or equal to three, and has at least one positive coefficient and one negative coefficient, and for computing foveal coefficients from said received n-dimensional digital input signal and said computed translated discrete foveal filters as the one-dimensional inner products between said n-dimensional digital input signal in the direction of said trajectory and each of said translated discrete foveal filters satisfying a support condition.

74. The apparatus of claim 73, wherein said translated discrete foveal filters are computed with continuous parameter foveal filters.

75. The apparatus of claim 74, wherein said continuous parameter foveal filters are wavelet foveal filters obtained by dilating mother wavelets with a plurality of dilation factors and dilating scaling functions with a single scale factor for each.

76. The apparatus of claim 74, wherein said continuous parameter foveal filters are computed with an interpolation procedure of discrete foveal filters.

77. The apparatus of claim 76, wherein said discrete foveal filters are discrete wavelets for a plurality of scales and a plurality of translations and discrete scaling filters at one scale for each said scaling filter and for a plurality of translations.

78. The apparatus of claim 75, wherein for each trajectory point of said n-directional trajectory list, each of said scaling functions is dilated by a scale that is adapted to be small enough to satisfy said support condition.

79. The apparatus of claim 77, wherein for each trajectory point of said n-directional trajectory list, the scale of each said discrete scaling filters is adapted to be small enough to satisfy said support condition.

80. The apparatus of claim 73, wherein said family of translated discrete foveal filters is computed with a quantized trajectory point coordinate, wherein said quantized trajectory point coordinate is computed by quantizing said coordinate of trajectory point to an integer multiple of a fixed fraction of an integer.

81. The apparatus of claim 73 further comprising a bandelet processor, coupled to said foveal trajectory processor and receiving said computed foveal coefficients therefrom, for computing bandelet coefficients from said computed foveal coefficients and said n-directional trajectory list for decorrelating all computed foveal coefficients by applying invertible linear operators on the vectors of said foveal coefficients along each said trajectory and for each said foveal filter.

82. The apparatus of claim 81 wherein n=2 and said linear operators are implemented with spatial transforms applied on all largest intervals of consecutive said foveal coefficients for which said translated discrete foveal filter satisfies said support condition.

83. The apparatus of claim 73 further comprising a geometric processor, coupled to said second input interface and receiving said n-directional trajectory list therefrom, for computing geometric coefficients from said received n-directional trajectory list and for decorrelating said coordinates of points along each trajectory of said n-directional trajectory list, by applying invertible linear operators on the vectors of said coordinates along each said trajectory.

84. The apparatus of claim 73 further comprising a trajectory finder, coupled to said first input interface and receiving said n-dimensional input signal therefrom, for filtering each line of said input signal in each of the n directions of its sampling grid with a plurality of predefined trajectory filters; detecting trajectory points as one-dimensional local maxima for each of the n directions, along each line of said input signal, of an energy computed from the outputs of said filtering; chaining independently neighboring said trajectory points in each of the n directions and outputting overlapping n-directional trajectories, and performing a non overlapping partition of said overlapping n-directional trajectories, and outputting an n-directional trajectory list.

85. The apparatus of claim 73 further comprising:
  a. a foveal reconstruction processor, coupled to said foveal trajectory processor and receiving said computed foveal coefficients therefrom, for generating a reconstruction signal by minimizing a quadratic functional, said quadratic functional being computed as the sum of
    i. a regularization functional defined as the sum of the squared norms of components obtained by multiplying with weighting masks the convolution of said foveal reconstruction signal with predefined regularization filters; and
    ii. a quadratic distance between reconstructed foveal coefficients and said foveal coefficients, wherein said reconstructed foveal coefficients are the one-dimensional inner products between said foveal reconstruction signal in the direction of each of said trajectories and each said translated discrete foveal filter satisfying a support condition; and
  b. a residue circuit, coupled to said foveal reconstruction processor and receiving said n-dimensional input signal, for computing a foveal residue by subtracting from said n-dimensional input signal said foveal reconstruction signal.

86. The apparatus of claim 81, further comprising an inverse bandelet processor, coupled to said bandelet processor and receiving said computed bandelet coefficients therefrom, for computing reconstructed foveal coefficients corresponding to said computed foveal coefficients.

87. The apparatus of claim 83, further comprising an inverse geometric processor, coupled to said geometric processor and receiving said computed geometric coefficients therefrom, for determining a reconstructed n-directional trajectory list from said computed geometric coefficients.

88. A foveal reconstruction apparatus for computing an n-dimensional foveal reconstruction signal, comprising:
  a. a first input interface for receiving input foveal coefficients;
  b. a second input interface for receiving an n-directional trajectory list, comprising a plurality of trajectories, wherein each of said trajectories includes a direction information, a connected parameter set information, and coordinate information of one or more trajectory points defined over said parameter set; and
  c. a foveal reconstruction processor, coupled to said first and said second input interfaces, for computing, for each trajectory point of each trajectory of said n-directional trajectory list, a family of at least 3 translated discrete foveal filters from said received n-directional trajectory list with the coordinate of said trajectory point, where at least one translated discrete foveal filter has a support size larger or equal to 3, and has one positive coefficient and one negative coefficient and for computing said foveal reconstruction signal from said received foveal coefficients and said computed family of translated discrete foveal filters, by minimizing a quadratic functional, said quadratic functional being computed as the sum of
    A. a regularization functional defined as the sum of the squared norms of components obtained by multiplying with weighting masks the convolution of said foveal reconstruction signal with predefined regularization filters; and
    B. a quadratic distance between reconstructed foveal coefficients and said input foveal coefficients, wherein said reconstructed foveal coefficients are the one-dimensional inner products between said foveal reconstruction signal in the direction of each of said trajectories and each said translated discrete foveal filter satisfying a support condition.

89. An apparatus for compressing an n-dimensional digital input signal, comprising:
  a. an input interface for receiving said n-dimensional digital input signal; and
  b. a trajectory finder coupled to said input interface for computing an n-directional trajectory list from said received n-dimensional digital input signal; and
  c. a foveal trajectory processor coupled to said input interface and receiving said digital input signal therefrom, also coupled to said trajectory finder and receiving said computed n-directional trajectory list therefrom, and computing foveal coefficients from said digital input signal and said n-directional trajectory list; and
  d. a bandelet processor coupled to said foveal trajectory processor and receiving said computed foveal coefficients therefrom, q, and computing bandelet coefficients from said computed foveal coefficients; and
  e. a geometric processor coupled to said trajectory finder and receiving said n-directional trajectory list therefrom, and computing geometric coefficients from said n-directional trajectory list; and
  f. a first quantizer coupled to said bandelet processor, receiving said bandelet coefficients therefrom for quantizing said bandelet coefficients and outputting quantized bandelet coefficients; and a second quantizer coupled to said geometric processor, receiving said geometric coefficients therefrom for quantizing said geometric coefficients and outputting quantized geometric coefficients; and
  g. a coder coupled to said first and second quantizers and receiving said quantized bandelet coefficients and said quantized geometric coefficients therefrom, and encoding said quantized bandelet coefficients and said quantized geometric coefficients into a signal code.

90. An apparatus for decompressing an n-dimensional digital signal compressed with the apparatus of claim 89, comprising
  a. a decoder receiving said signal code for computing from said signal code recovered bandelet coefficients and recovered geometric coefficients corresponding respectively to said quantized bandelet coefficients and said quantized geometric coefficients; and b. an inverse bandelet processor coupled to said decoder and receiving said recovered bandelet coefficients therefrom, and computing recovered foveal coefficients from said recovered bandelet coefficients; and c. an inverse geometric processor coupled to said decoder and receiving said recovered geometric coefficients therefrom, and computing a recovered trajectory list from said recovered geometric coefficients; and d. a foveal reconstruction processor coupled to said inverse bandelet processor and receiving said recovered foveal coefficients therefrom, and also coupled to said inverse geometric processor and receiving said recovered trajectory list therefrom, and computing a foveal reconstruction signal from said recovered foveal coefficients and said recovered trajectory list; and e. an output interface coupled to said foveal reconstruction processor and receiving said foveal reconstruction signal therefrom, for outputting said foveal reconstruction signal.

91. An apparatus for compressing an n-dimensional digital input signal and comprising:

a. an input interface for receiving said n-dimensional digital input signal; and b. a trajectory finder coupled to said input interface for computing an n-directional trajectory list from said received n-dimensional digital input signal; and c. a foveal trajectory processor coupled to said input interface and receiving said digital input signal therefrom, also coupled to said trajectory finder and receiving said computed n-directional trajectory list therefrom, and computing foveal coefficients from said digital input signal and said n-directional trajectory list; and d. a bandelet processor coupled to said foveal trajectory processor and receiving said computed foveal coefficients therefrom, and computing bandelet coefficients from said computed foveal coefficients; and e. a geometric processor coupled to said trajectory finder and receiving said n-directional trajectory list therefrom, and computing geometric coefficients from said n-directional trajectory list; and f. a first foveal reconstruction processor coupled to said trajectory finder and receiving said n-directional trajectory list therefrom, also coupled to said foveal trajectory processor and receiving said foveal coefficients therefrom, for computing a first foveal reconstruction signal from said n-directional trajectory list and said foveal coefficients; and g. a residue circuit coupled to said first foveal reconstruction processor and receiving said first foveal reconstruction signal, also coupled to said input interface and receiving said input signal therefrom, for computing a foveal residue by subtracting said first foveal reconstruction signal from said input signal; and h. a transform circuit coupled to said residue circuit and receiving said foveal residue therefrom, for computing a transformed residue by applying a decorrelation operator on said foveal residue; and i. a first quantizer coupled to said bandelet processor, receiving said bandelet coefficients therefrom for quantizing said bandelet coefficients and outputting quantized bandelet coefficients; and a second quantizer coupled to said geometric processor, receiving said geometric coefficients therefrom for quantizing said geometric coefficients and outputting quantized geometric coefficients; and a third quantizer coupled to said transform circuit, receiving said transformed residue for quantizing said transformed residue and outputting quantized transformed residue; and j. a coder coupled to said first, second, and third quantizers and receiving said quantized bandelet coefficients, said quantized geometric coefficients and said quantized transformed residue therefrom, and encoding said quantized bandelet coefficients, said quantized geometric coefficients and said quantized transformed residue into a signal code.

92. An apparatus for decompressing an n-dimensional digital signal compressed with the apparatus of claim 91, comprising a. a decoder receiving said signal code for computing from said signal code recovered bandelet coefficients, recovered geometric coefficients and a recovered transformed residue corresponding respectively to said quantized bandelet coefficients, said quantized geometric coefficients and said quantized transformed residue; and b. an inverse bandelet processor coupled to said decoder and receiving said recovered bandelet coefficients therefrom, and computing recovered foveal coefficients from said recovered bandelet coefficients; and c. an inverse geometric processor coupled to said decoder and receiving said recovered geometric coefficients therefrom, and computing a recovered trajectory list from said recovered geometric coefficients; and d. an inverse transform circuit coupled to said decoder and receiving said recovered transformed residue therefrom, and computing a recovered residue by applying a transform operator to said recovered transformed residue that is substantially the inverse of said decorrelation operator; and e. a second foveal reconstruction processor coupled to said inverse bandelet processor and receiving said recovered foveal coefficients therefrom, and also coupled to said inverse geometric processor and receiving said recovered trajectory list therefrom, and computing a second foveal reconstruction signal from said recovered foveal coefficients and said recovered trajectory list; and f. an addition circuit coupled to said second foveal reconstruction processor, and receiving said foveal reconstruction signal therefrom, also coupled to said inverse transform circuit and receiving said recovered residue therefrom, for adding said recovered residue to said second foveal reconstruction signal to obtain a recovered signal; and g. an output interface coupled to said addition circuit and receiving said recovered signal therefrom, for outputting said recovered signal.

93. An apparatus for denoising an n-dimensional digital signal comprising a. an input interface for receiving said n-dimensional digital input signal; and b. a trajectory finder coupled to said input interface for computing an n-directional trajectory list from said received n-dimensional digital input signal; and c. a foveal trajectory processor coupled to said input interface and receiving said digital input signal therefrom, also coupled to said trajectory finder and receiving said computed n-directional trajectory list therefrom, and computing foveal coefficients from said digital input signal and said n-directional trajectory list; and d. a bandelet processor coupled to said foveal trajectory processor and receiving said computed foveal coefficients therefrom, and computing bandelet coefficients from said computed foveal coefficients; and e. a geometric processor coupled to said trajectory finder and receiving said n-directional trajectory list therefrom, and computing geometric coefficients from said n-directional trajectory list; and f. a first foveal reconstruction processor coupled to said trajectory finder and receiving said n-directional trajectory list therefrom, also coupled to said foveal trajectory processor and receiving said foveal coefficients therefrom, for computing a first foveal reconstruction signal from said n-directional trajectory list and said foveal coefficients; and g. a residue circuit coupled to said first foveal reconstruction processor and receiving said first foveal reconstruction signal, also coupled to said input interface and receiving said input signal therefrom, for computing a foveal residue by subtracting said first foveal reconstruction signal from said input signal; and h. a transform circuit coupled to said residue circuit and receiving said foveal residue therefrom, for computing a transformed residue by applying a decorrelation operator on said foveal residue; and i. a first threshold system coupled to said bandelet processor, receiving said bandelet coefficients therefrom for thresholding said bandelet coefficients and outputting thresholded bandeled coefficients; and a second threshold system coupled to said geometric processor, receiving said geometric coefficients therefrom for thresholding said geometric coefficients and outputting thresholded geometric coefficients; and a third threshold system coupled to said transform circuit, receiving said transformed residue for thresholding said transformed residue and outputting thresholded transformed residue; and j. an inverse bandelet processor coupled to said first threshold system and receiving said thresholded bandelet coefficients therefrom, and computing processed foveal coefficients from said thresholded bandelet coefficients; and k. an inverse geometric processor coupled to said second threshold system and receiving said thresholded geometric coefficients therefrom, and computing a processed trajectory list from said thresholded geometric coefficients; and l. an inverse transform circuit coupled to said third threshold system and receiving said thresholded transformed residue therefrom, and computing a processed residue by applying a transform operator to said thresholded transformed residue that is substantially the inverse of said decorrelation operator; and m. a second foveal reconstruction processor coupled to said inverse bandelet processor and receiving said processed foveal coefficients therefrom, and also coupled to said inverse geometric processor and receiving said processed trajectory list therefrom, and computing a second foveal reconstruction signal from said processed foveal coefficients and said processed trajectory list; and n. an addition circuit coupled to said second foveal reconstruction processor, and receiving said foveal reconstruction signal therefrom, also coupled to said inverse transform circuit and receiving said processed residue therefrom, for adding said processed residue to said second foveal reconstruction signal to obtain a processed signal; and o. an output interface coupled to said addition circuit and receiving said processed signal therefrom, for outputting said processed signal.

* * * * *